US010775626B1

(12) United States Patent
Stratton et al.

(10) Patent No.: US 10,775,626 B1
(45) Date of Patent: Sep. 15, 2020

(54) WIDE FIELD OF VIEW HEAD WORN DISPLAY DEVICE

(71) Applicant: Rockwell Collins, Inc., Cedar Rapids, IA (US)

(72) Inventors: Eric P. Stratton, Portland, OR (US); Wyatt Lee Hendrick, Encinitas, CA (US); Robert D. Brown, Lake Oswego, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/413,931

(22) Filed: May 16, 2019

(51) Int. Cl.
*G02B 27/01* (2006.01)
*G02B 27/30* (2006.01)
*G02B 6/122* (2006.01)

(52) U.S. Cl.
CPC ......... *G02B 27/0172* (2013.01); *G02B 6/122* (2013.01); *G02B 27/30* (2013.01)

(58) Field of Classification Search
CPC ..... G02B 27/0172; G02B 27/30; G02B 6/122
See application file for complete search history.

(56) References Cited

U.S. PATENT DOCUMENTS

| | | | |
|---|---|---|---|
| 8,233,204 B1* | 7/2012 | Robbins | G02B 27/0149 359/15 |
| 10,222,620 B2* | 3/2019 | Bohn | G02B 27/0172 |
| 10,497,295 B1* | 12/2019 | Jia | G09G 3/02 |
| 2010/0202048 A1* | 8/2010 | Amitai | G02B 27/28 359/485.02 |
| 2014/0140653 A1* | 5/2014 | Brown | G02B 27/0172 385/10 |
| 2018/0157057 A1* | 6/2018 | Gelberg | G02F 1/136277 |
| 2018/0292676 A1* | 10/2018 | Alexander | G02B 6/0016 |
| 2019/0278086 A1* | 9/2019 | Ofir | G02B 27/01 |

* cited by examiner

*Primary Examiner* — Ibrahim A Khan
(74) *Attorney, Agent, or Firm* — Suiter Swantz pc llo

(57) ABSTRACT

A head worn display device is disclosed. Each of two display assemblies includes a first waveguide with a field of view and a second waveguide with a field of view, where the fields of view are overlapped to generate a combined field of view for each of the display assemblies. Each of the display assemblies further includes a first collimator and a second collimator, where each collimator is configured to direct illumination through the waveguide stack along a single axis, and where each collimator is rotated a select angle to offset the combined field of view to merge collimator pupils and generate a seamless total field of view for each of the display assemblies. Each of the display assemblies are rotated a select angle to offset the respective total fields of view along the single axis and generate a seamless wide field of view for the head worn display device.

20 Claims, 19 Drawing Sheets

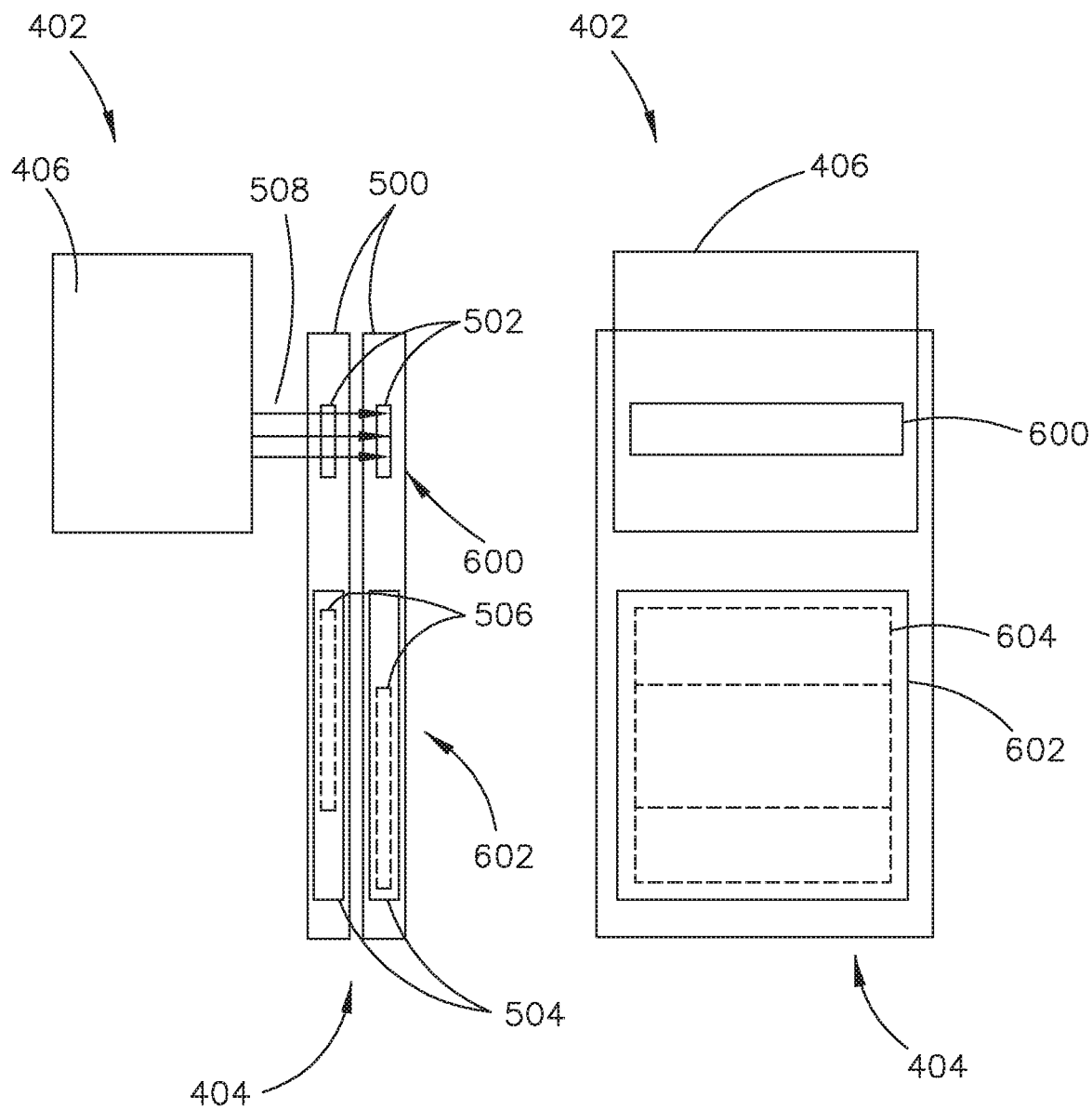

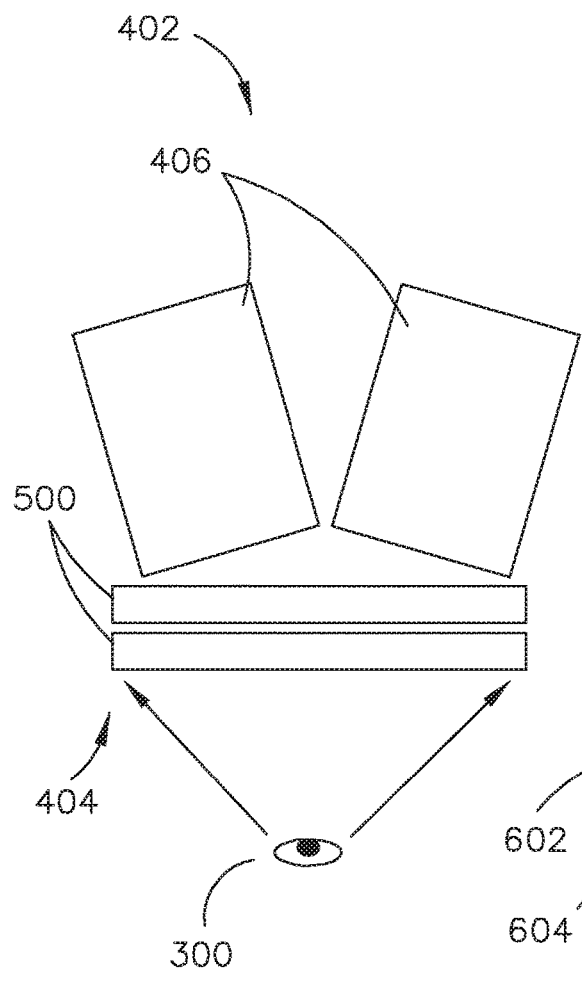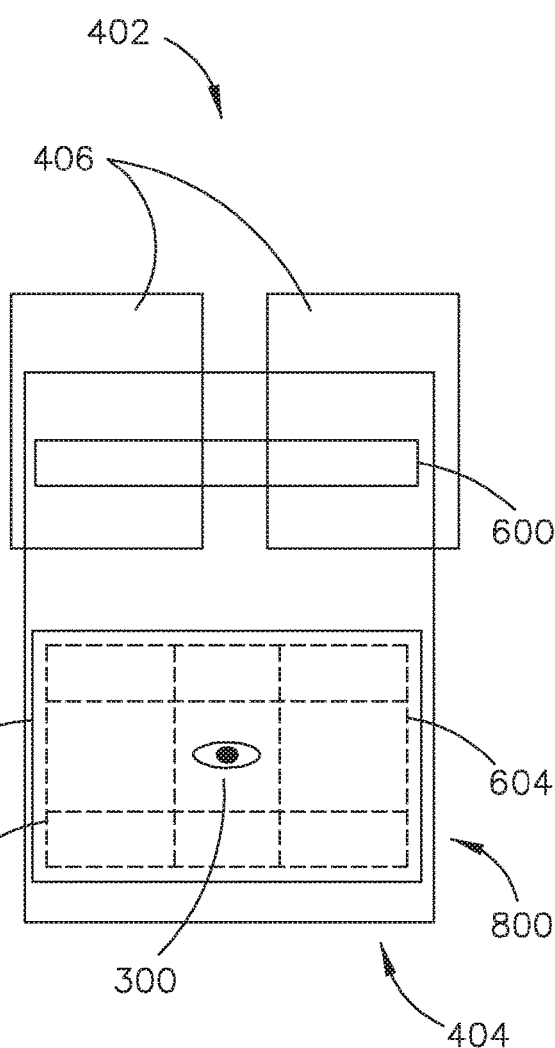
FIG. 8A
FIG. 8B

WIDE FIELD OF VIEW HEAD WORN DISPLAY DEVICE

BACKGROUND

Head worn displays are increasingly finding cockpit applications. To generate a wide field of view (FOV), select head worn displays may include multiple displays. Where the multiple displays are tiled, any points of overlap may result in seams in the vision of the user and/or discontinuities in the real-world distortion, causing an image to jump from window frame to window frame.

SUMMARY

A head worn display device is disclosed. In one or more embodiments, the display device includes a first display assembly and a second display assembly. Each of the first display assembly and the second display assembly includes a waveguide stack. The waveguide stack includes at least one set of waveguides, where each set of the at least one set of waveguides includes a first waveguide with a field of view and a second waveguide with a field of view. The waveguide stack further includes a combined field of view generated by at least partially overlapping the field of view of the first waveguide and the field of view of the second waveguide. Each of the first display assembly and the second display assembly further includes a first collimator configured to direct illumination through the waveguide stack. The first collimator is rotated a select collimator offset angle to offset the combined field of view in a first direction along a single axis. Each of the first display assembly and the second display assembly further includes a second collimator configured to direct illumination through the waveguide stack. The second collimator is rotated a select collimator offset angle to offset the combined field of view in a second direction along the single axis. Offsetting the combined field of view merges a pupil of the first collimator and a pupil of the second collimator and generates a total field of view for each of the first display assembly and the second display assembly. The first display assembly is rotated a select display assembly offset angle to offset the total field of view of the first display assembly in the first direction along the single axis. The second display assembly is rotated a select display assembly offset angle to offset the total field of view of the second display assembly in the second direction along the single axis. Rotating the first display assembly and the second display assembly generates a seamless wide field of view for the head worn display device.

In some embodiments of the head worn display device, the field of view of the first waveguide is 40 degrees by 30 degrees and the field of view of the second waveguide is 40 degrees by 30 degrees.

In some embodiments of the head worn display device, the combined field of view is 40 degrees by 40 degrees generated by overlapping the field of view of the first waveguide and the field of view of the second waveguide by 20 degrees.

In some embodiments of the head worn display device, the collimator offset angle of the first collimator and the collimator offset angle of the second collimator is equal and opposite in degrees.

In some embodiments of the head worn display device, the collimator offset angle of the first collimator is 15 degrees and the collimator offset angle of the second collimator is −15 degrees.

In some embodiments of the head worn display device, a field of view of the collimator is 40 degrees by 40 degrees and a field of view of the second collimator is 40 degrees by 40 degrees.

In some embodiments of the head worn display device, the combined field of view is 70 degrees by 40 degrees generated by overlapping the field of view of the first collimator and the field of view of the second collimator by 10 degrees.

In some embodiments of the head worn display device, the display assembly offset angle of the first display assembly and the display assembly offset angle of the second display assembly is equal and opposite in degrees.

In some embodiments of the head worn display device, the display assembly offset angle of the first display assembly is 20 degrees and the display assembly offset angle of the second display assembly is −20 degrees.

In some embodiments of the head worn display device, the wide field of view is 110 degrees by 40 degrees.

In some embodiments of the head worn display device, the first waveguide and the second waveguide each include an input grating.

In some embodiments of the head worn display device, the input grating of the first waveguide and the input grating of the second waveguide is configured to overlap when the first waveguide and the second waveguide are aligned within the waveguide stack.

In some embodiments of the head worn display device, the first waveguide and the second waveguide each include an output grating.

In some embodiments of the head worn display device, the output grating of the first waveguide and the output grating of the second waveguide is configured to overlap when the first waveguide and the second waveguide are aligned within the waveguide stack.

In some embodiments of the head worn display device, the at least one set of waveguides includes a single set of waveguides configured to generate a monochrome color image.

In some embodiments of the head worn display device, the at least one set of waveguides includes three sets of waveguides configured to generate a multicolor image, where each set of the three sets of waveguides is configured to produce a different base color for the multicolor image.

A display assembly for a head worn display device is also disclosed. In one or more embodiments, the display assembly includes a waveguide stack including at least one set of waveguides. Each set of the at least one set of waveguides includes a first waveguide with a field of view and a second waveguide with a field of view. The waveguide stack further includes a combined field of view generated by at least partially overlapping the field of view of the first waveguide and the field of view of the second waveguide. The display assembly further includes a first collimator configured to direct illumination through the waveguide stack. The first collimator is rotated a select collimator offset angle to offset the combined field of view of the waveguide stack in a first direction along a single axis. The display assembly further includes a second collimator configured to direct illumination through the waveguide stack. The second collimator is rotated a select collimator offset angle to offset the combined field of view of the waveguide stack in a second direction along the single axis. Offsetting the combined field of view merges a pupil of the first collimator and a pupil of the second collimator and generates a total field of view for the display assembly.

In some embodiments of the display assembly, the at least one set of waveguides includes a single set of waveguides configured to generate a monochrome color image.

In some embodiments of the display assembly, the at least one set of waveguides includes three sets of waveguides configured to generate a multicolor image via the display assembly, where each set of the three sets of waveguides is configured to produce a different base color for the multicolor image.

A display device is also disclosed. In one or more embodiments, the display device includes a first display assembly and a second display assembly. Each of the first display assembly and the second display assembly includes a waveguide stack. The waveguide stack includes three sets of waveguides configured to generate a multicolor image, where each set of the three sets of waveguides is configured to produce a different base color for the multicolor image, where each set of the at least one set of waveguides includes a first waveguide with a field of view and a second waveguide with a field of view. The waveguide stack further includes a combined field of view generated by at least partially overlapping the field of view of the first waveguide and the field of view of the second waveguide. Each of the first display assembly and the second display assembly further includes a first collimator configured to direct illumination through the waveguide stack. The first collimator is rotated a select collimator offset angle to offset the combined field of view of the waveguide stack in a first direction along a single axis. Each of the first display assembly and the second display assembly further includes a second collimator configured to direct illumination through the waveguide stack. The second collimator is rotated a select collimator offset angle to offset the combined field of view of the waveguide stack in a second direction along the single axis. Offsetting the combined field of view merges a pupil of the first collimator and a pupil of the second collimator and generates a seamless total field of view for each of the first display assembly and the second display assembly. The first display assembly is rotated a select display assembly offset angle to offset the total field of view of the first display assembly in the first direction along the single axis. The second display assembly is rotated a select display assembly offset angle to offset the total field of view of the second display assembly in the second direction along the single axis. Rotating the first display assembly and the second display assembly generates a seamless wide field of view for the head worn display device.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 6A schematically illustrates a display assembly of a wide field of view head worn display device, such as the wide field of view head worn display device illustrated in FIG. 4, in accordance with one or more embodiments of the disclosure;

FIG. 6B schematically illustrates a display assembly of a wide field of view head worn display device, such as the wide field of view head worn display device illustrated in FIG. 4, in accordance with one or more embodiments of the disclosure;

FIG. 8B schematically illustrates a display assembly of a wide field of view head worn display device, such as the wide field of view head worn display device illustrated in FIG. 4, in accordance with one or more embodiments of the disclosure;

DETAILED DESCRIPTION OF THE INVENTION

Figure 1:
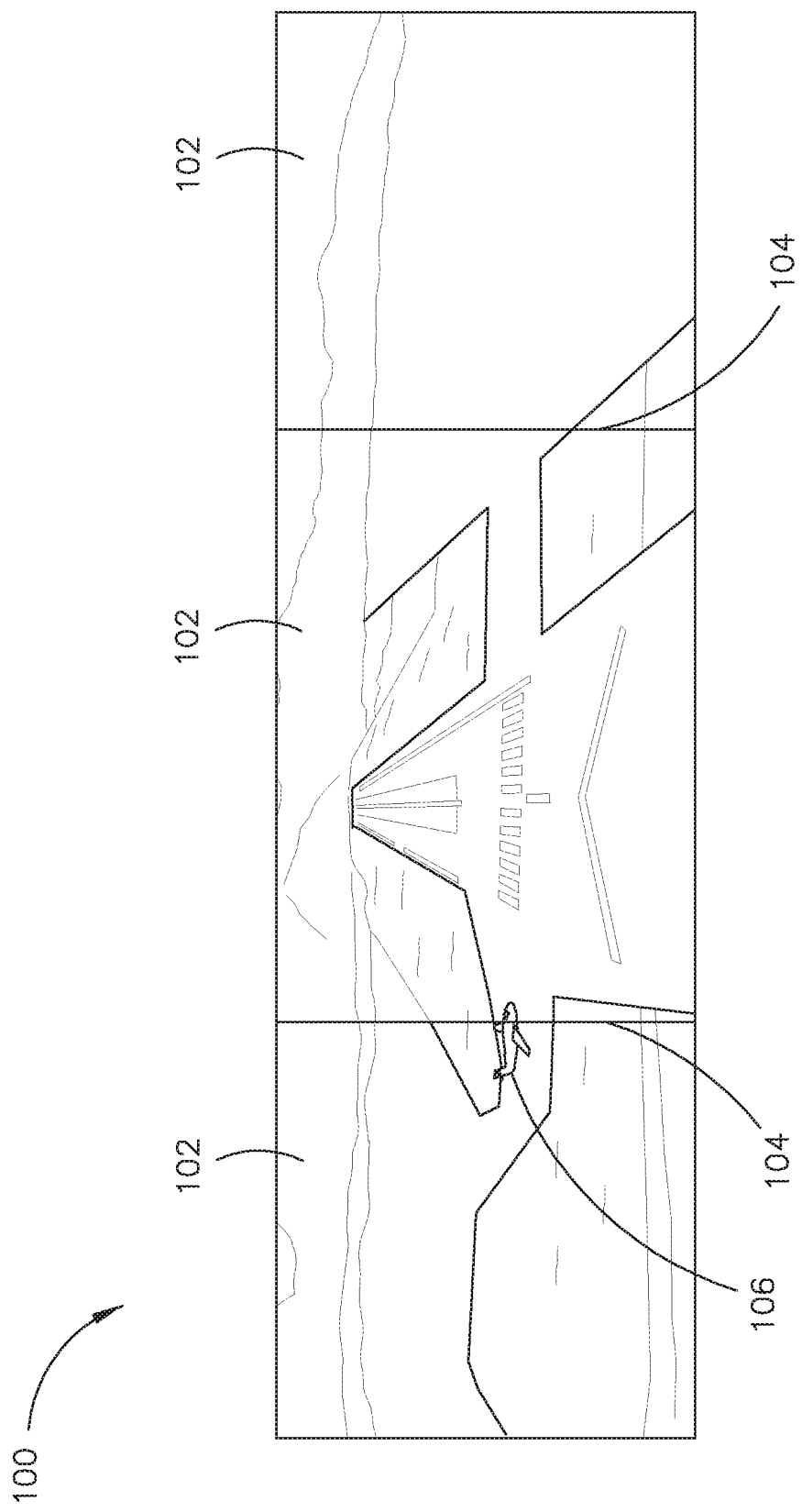
FIG. 1 is a tiled display avionics environment, in accordance with one or more embodiments of the disclosure.
Figure 2:
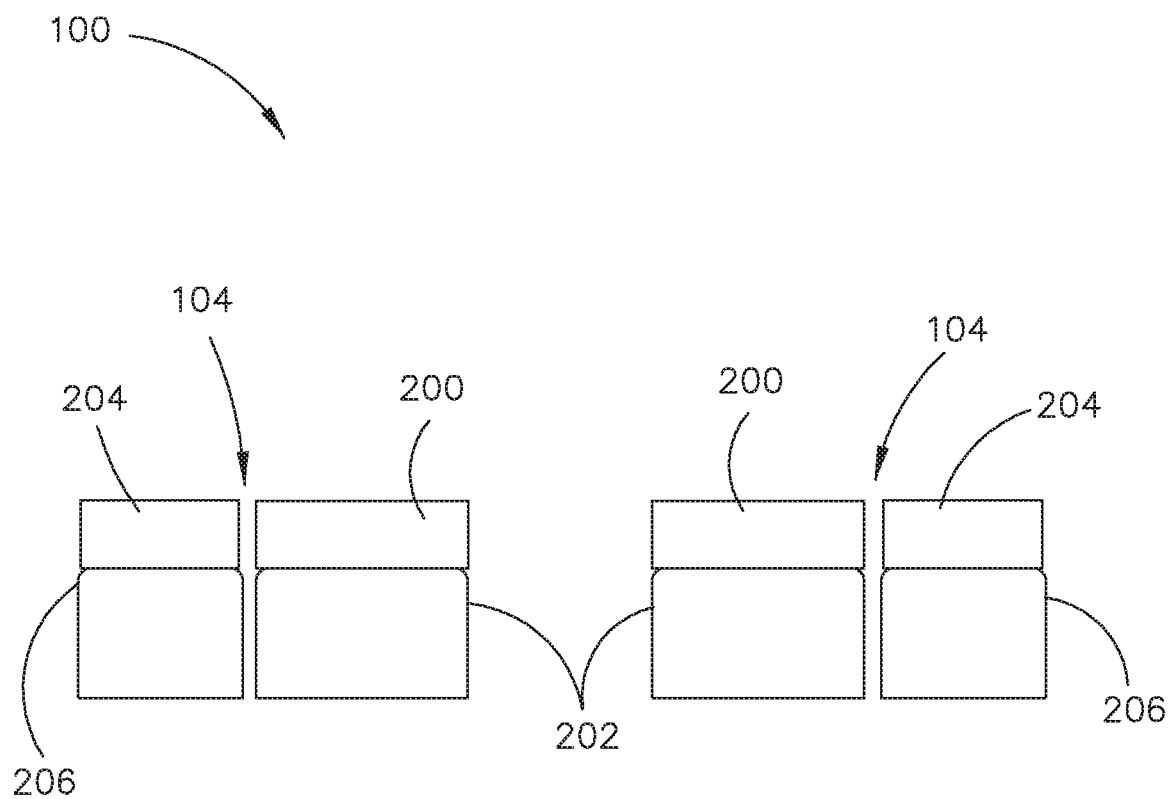
FIG. 2 schematically illustrates an example head worn display device, in accordance with one or more embodiments of the disclosure.
Figure 3A:
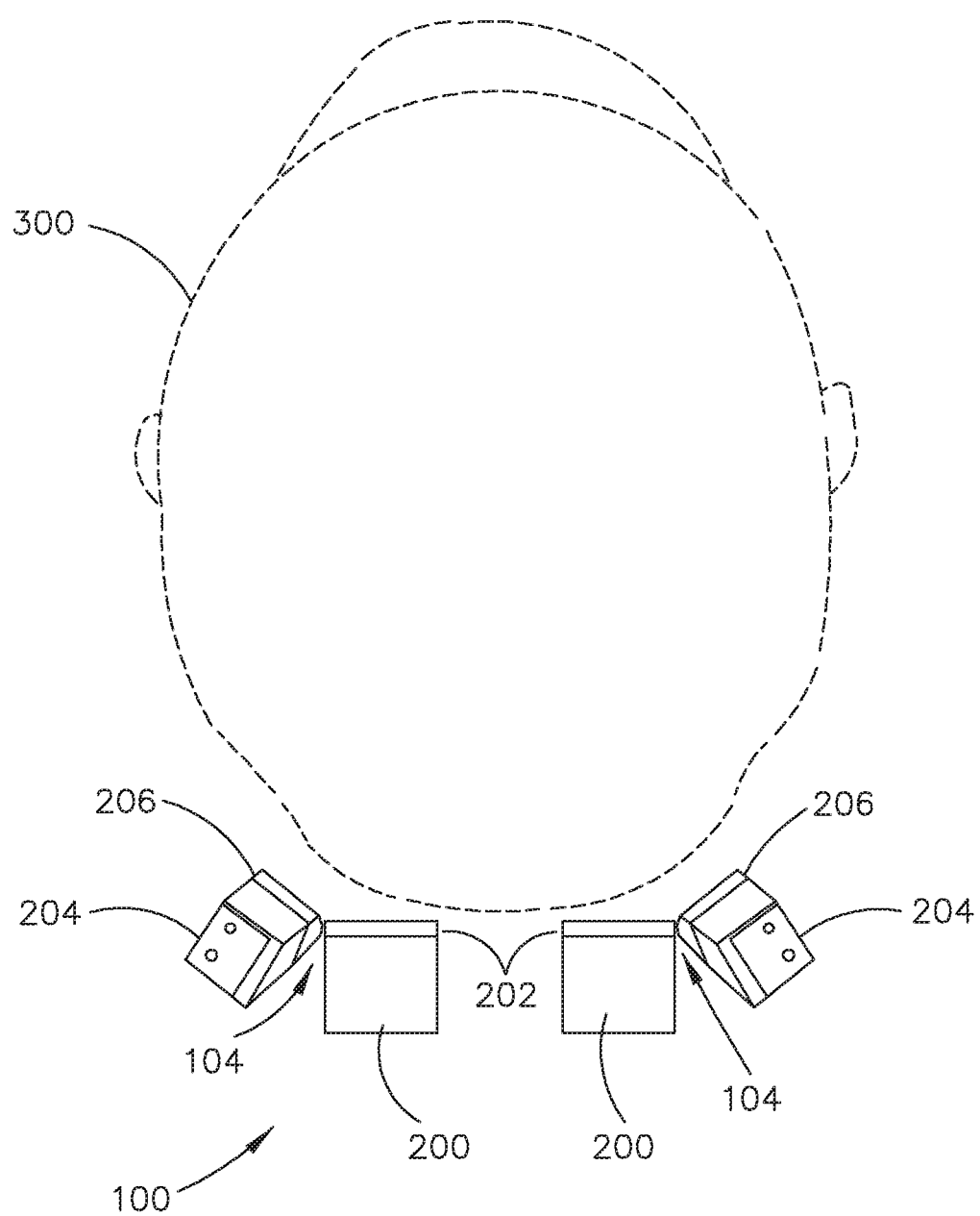
FIG. 3A schematically illustrates an example head worn display device, such as the display device illustrated in FIG. 2, in accordance with one or more embodiments of the disclosure.
Figure 3B:
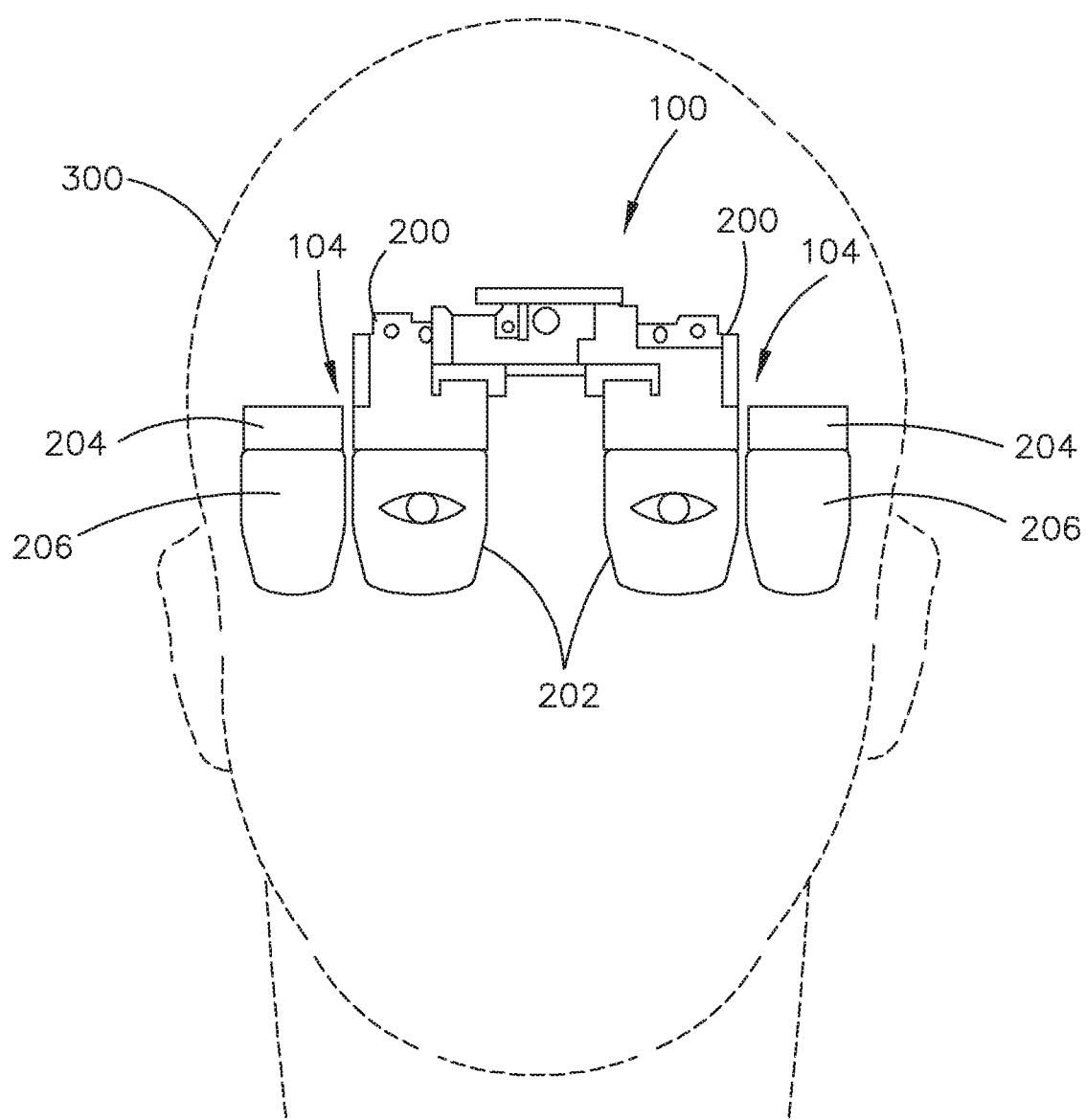
FIG. 3B schematically illustrates an example head worn display device, such as the display device illustrated in FIG. 2, in accordance with one or more embodiments of the disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1 a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

FIGS. 1-3B generally illustrate an example head worn display device 100. It is noted herein that "example head worn display device 100" and "example display device 100" are equivalent, for purposes of the present disclosure.

The example wide field of view head worn display device 100 may include a set of tiled displays 102 to achieve a desired wide field of view. Tiling of adjacent displays in the set of displays 102 may cause a border split or seam 104.

The example display device 100 may be prism-based. For instance, the example display device 100 may include a micro-display 200 and a corresponding primary viewing window 202 configured to provide an image to each eye of the operator 300. In addition, the example display device 100 may include a micro-display 204 and a corresponding secondary viewing window 206 for each eye of the operator 300, where the set of micro-displays 204 are configured to increase the field of view width via the set of secondary viewing windows 206. The example wide field of view head worn display device 100 may include the seam 104 between the primary viewing window 202 and the secondary viewing window 204 for each eye.

The seam 104 of the example wide field of view head worn display device 100 may be observable within the line of sight of the operator 300. In addition, the seam 104 may cause real-world distortion of objects 106 within the line of sight of the operator 300. For example, the objects 106 may be broken across the seam 104 and/or may jump from display frame to display frame (e.g., from combiner to combiner).

As such, the example display device 100 may require a single set of tiled displays 102 per eye of the operator 300, where the single display may include waveguides within a waveguide stack, where each waveguide is configured to each address a portion of an entire field. The implementation provided in the example display device 100 may require dual-axis expansion within the waveguide, which may have significant challenges including, but not limited to, the waveguides within the waveguide stack lacking wide acceptance cones in the horizontal direction and, more generally, a limited wide field of view range (e.g., even with the tiled displays 102).

In this regard, in some embodiments the present invention may be directed to a head worn display device implementing a seamless tiling of multiple display through single-axis expansion of fields of view to generate a wide field of view.

FIG. 4-14 illustrate a wide field of view (FOV) head worn display device 400, in accordance with one or more embodiments of the disclosure. It is noted herein that "wide field of view head worn display device 400" and "display device 400" are equivalent, for purposes of the present disclosure.

Figure 4:
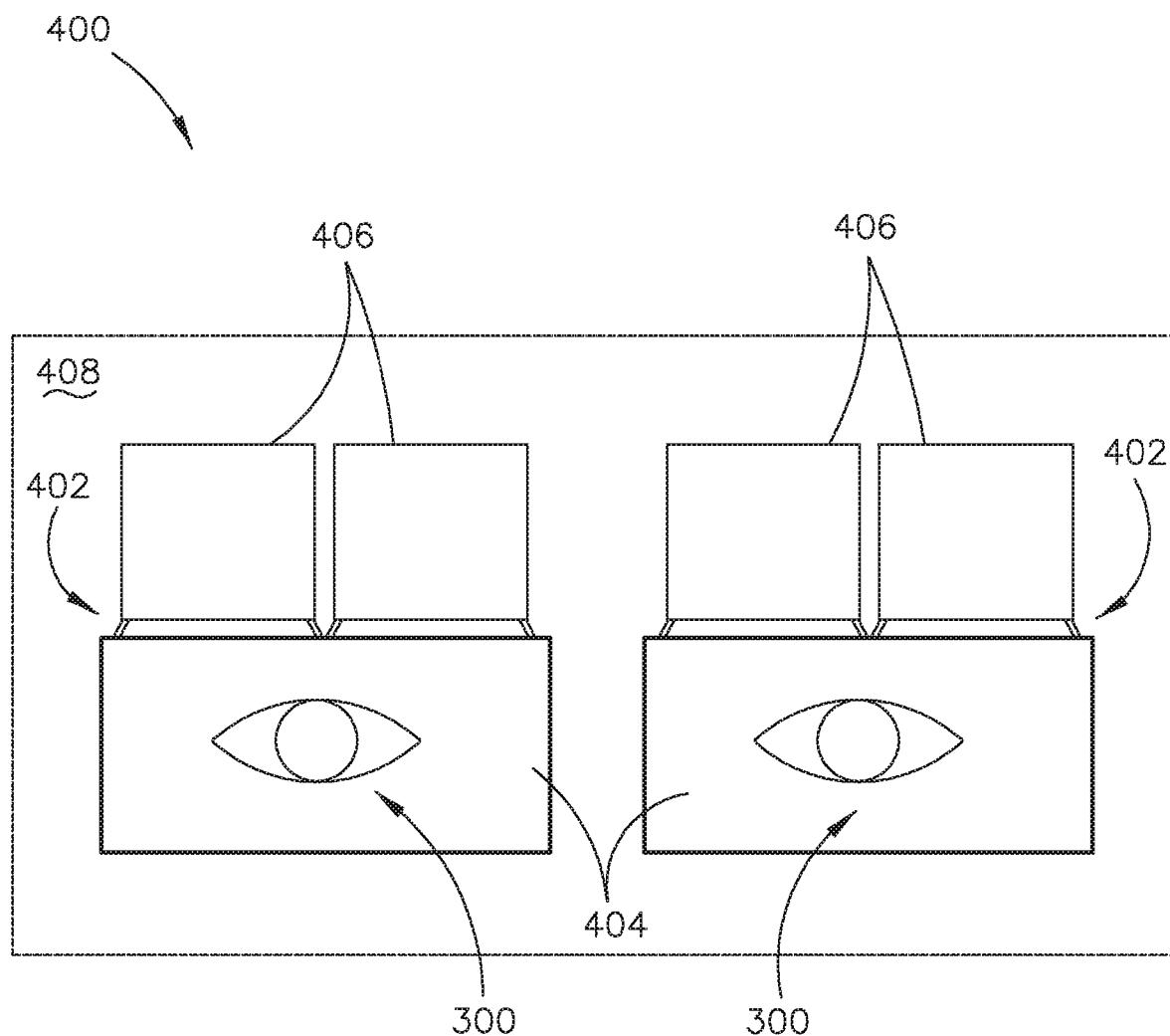
FIG. 4 schematically illustrates a wide field of view head worn display device, in accordance with one or more embodiments of the disclosure.

Referring now to FIG. 4, the display device 400 may include a set of display assemblies 402. For example, the display device 400 may include a display assembly 402 for each eye of the operator 300. Each display assembly 402 may include a waveguide stack 404. The waveguide stack 404 may receive illumination from one or more collimators 406. For example, the waveguide stack 404 may receive illumination from two collimators 406. By way of another example, the one or more collimators 406 may include a 40° (degrees) by 40° collimator 406. By way of another example, the one or more collimators 406 may include an aperture greater than 15 millimeters (mm) in diameter. By way of another example, the one or more collimators 406 may include a 30 mm×3 mm exit pupil. By way of another example, the one or more collimators 406 may be approximately 40 mm wide by 30 mm tall by 25 mm deep.

All or part of each display assembly 402 may be housed within a housing 408. The housing 408 may include one or more components necessary to couple the display device 400 to an operator 300 helmet or visor. The housing 408 may include one or more components necessary to allow the operator 300 to wear the display device 400 directly. The housing 408 may be configured to use in an airplane (e.g., in an airplane cockpit, or the like).

Figures 5A, 5B:
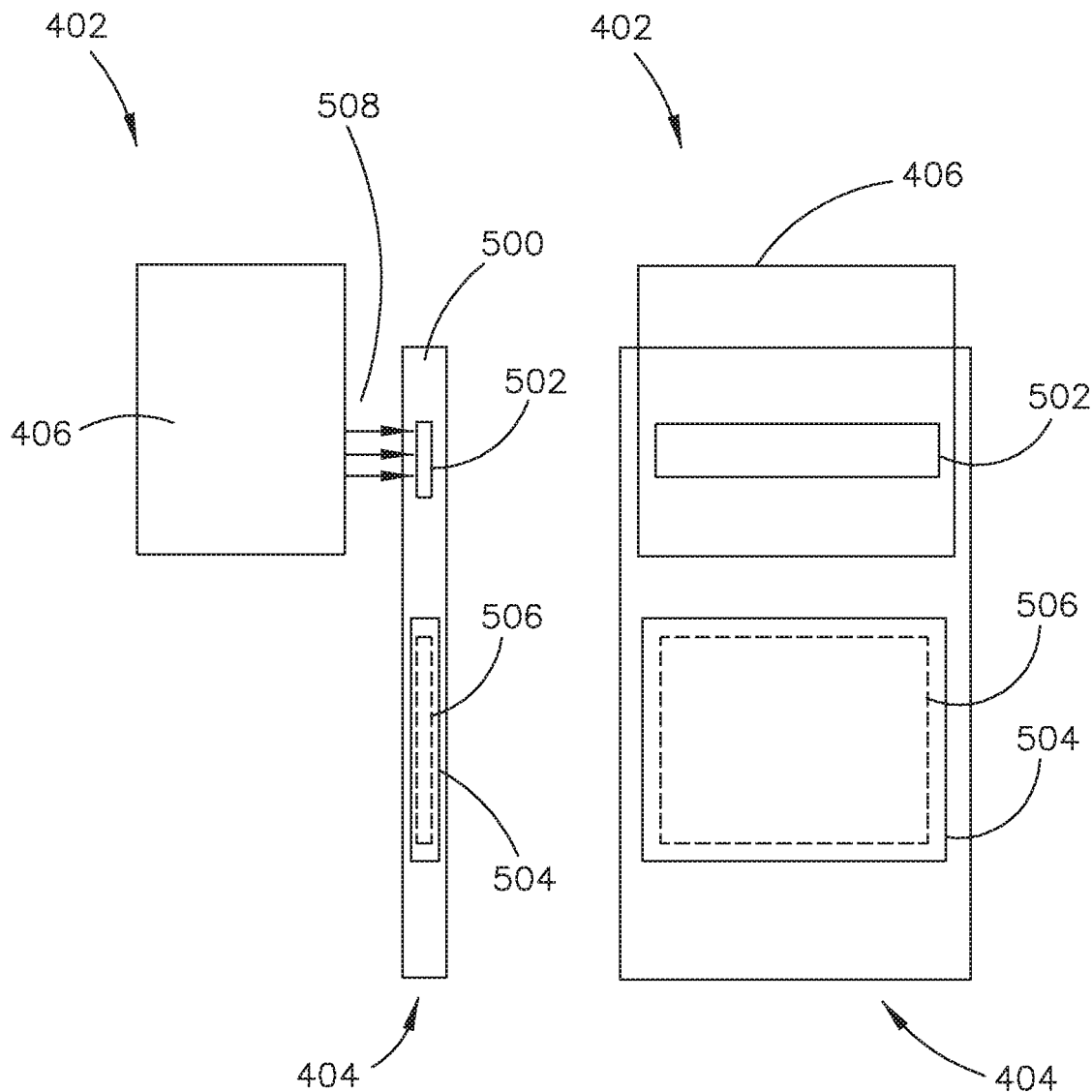
FIG. 5A schematically illustrates a display assembly of a wide field of view head worn display device, such as the wide field of view head worn display device illustrated in FIG. 4, in accordance with one or more embodiments of the disclosure.
FIG. 5B schematically illustrates a display assembly of a wide field of view head worn display device, such as the wide field of view head worn display device illustrated in FIG. 4, in accordance with one or more embodiments of the disclosure.

Referring now to FIGS. 5A and 5B, a waveguide stack 404 may include a waveguide 500. The waveguide 500 may include an input grating 502. The waveguide 500 may include an output grating 504 with a field of view 506. For example, the field of view 506 of the output grating 504 may range from 40° by 30° to 110° by 50°. For instance, the output grating 504 may include a 40° by 30° field of view 506.

Referring now to FIGS. 6A and 6B, the waveguide stack 404 may include a second waveguide 500. The second waveguide 500 may include a second input grating 502. The second waveguide 500 may include a second output grating 504 with a second field of view 506. For example, the second field of view 506 of the second output grating 504 may range from 40° by 30° to 110° by 50°. For instance, the second output grating 504 may include a 40° by 30° field of view 506.

The field of view 506 of the waveguide 500 and the second field of view 506 of the second waveguide 500 may be dimensionally equal (e.g., in size and shape). For example, both fields of view 506 may be 40° by 30°, as provided in the instances above. It is noted herein, however, that in some embodiments the field of view 506 of the waveguide 500 and the second field of view 506 of the second waveguide 500 may be dimensionally unequal (e.g., in size and shape). Therefore, the above description should not be interpreted as a limitation on the present disclosure but merely an illustration.

A collimator 406 may produce illumination 508. The collimator 406, the waveguide 500, and the second waveguide 500 may be aligned such that the illumination 508 may pass through the input grating 502 and the second input grating 502, which at least partially overlap and form a set of input gratings 600. For example, the waveguide 500 and the second waveguide 500 may be aligned in the waveguide stack 404 such that the input grating 502 and the second input grating 502 fully overlap when forming the set of input gratings 600.

The waveguide 500 and the second waveguide 500 may be aligned such that the output grating 504 with the field of view 506 and the second output grating 504 with the second field of view 506 at least partially overlap vertically (e.g., to address a full vertical field of view) and form a set of output gratings 602 with a combined field of view 604. For example, overlapping a 40° by 30° field for view 506 and a 40° by 30° second field of view 506 by 20° may result in a 40° by 40° combined field of view 604.

Figures 7A, 7B:
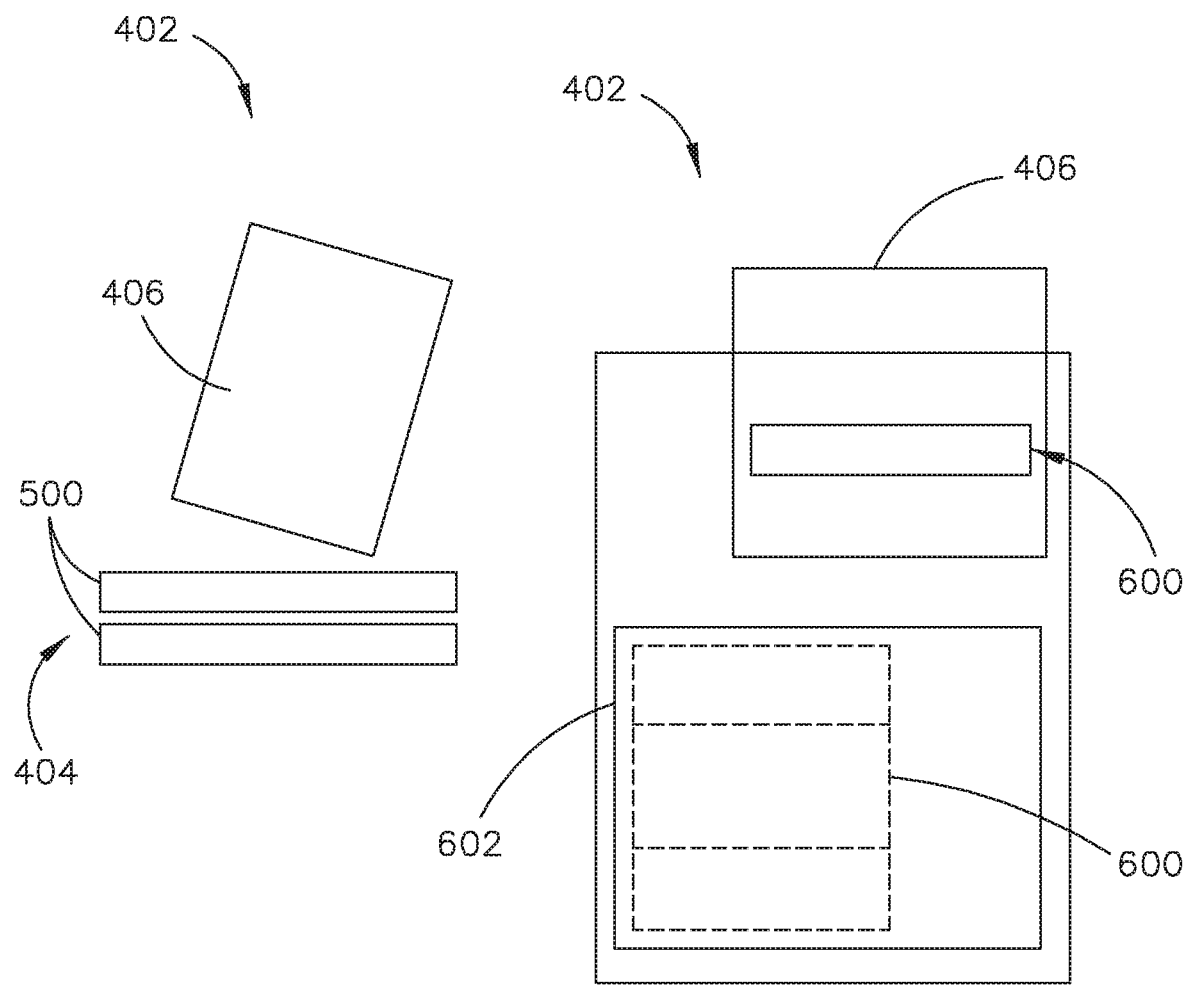
FIG. 7A schematically illustrates a display assembly of a wide field of view head worn display device, such as the wide field of view head worn display device illustrated in FIG. 4, in accordance with one or more embodiments of the disclosure.
FIG. 7B schematically illustrates a display assembly of a wide field of view head worn display device, such as the wide field of view head worn display device illustrated in FIG. 4, in accordance with one or more embodiments of the disclosure FIG. 8A schematically illustrates a display assembly of a wide field of view head worn display device, such as the wide field of view head worn display device illustrated in FIG. 4, in accordance with one or more embodiments of the disclosure.

Referring now to FIGS. 7A and 7B, the collimator 406 may be rotated. For example, the collimator 406 may be rotated to offset the combined field of view 604 (e.g., offset laterally). For instance, the collimator 406 may be rotated about a vertical axis to expand the combined field of view 604 horizontally. By way of another example, the collimator 406 may be rotated at an angle ranging from 5° to 30°. For instance, the collimator 406 may be rotated 15°.

Referring now to FIGS. 8A and 8B, a second collimator 406 may be added to the display assembly 402, as the waveguides within the waveguide stack 404 include wide acceptance cones in a horizontal direction (e.g., along a horizontal axis). The second collimator 406 may be rotated. For example, the second collimator 406 may be rotated to offset the combined field of view 604 (e.g., offset laterally). For instance, the second collimator 406 may be rotated about a vertical axis to expand the combined field of view 604 horizontally. By way of another example, the second collimator 406 may be rotated at an angle ranging from −5° to −30°. For instance, the second collimator 406 may be rotated −15°.

Where the display assembly 402 includes the collimator 406 and the second collimator 406, the combined field of view 604 may be a seamless total field of view 800. The collimator 406 and the second collimator 406 may include opposite offset. For example, the offset may be opposite and equal. For instance, the collimator 406 may be rotated 15° and the second collimator 406 may be rotated −15°. It is noted herein that the rotation of +/−15° of a 40° by 40° collimator 406 and a 40° by 40° second collimator 406, respectively, may result in a 70° total field of view 800 with a 10° overlap. In this regard, the display assembly 402 may include a 70° by 40° seamless total field of view 800. It is noted herein, however, that in some embodiments the offset may be opposite and unequal. Therefore, the above description should not be interpreted as a limitation on the present disclosure but merely an illustration.

Although embodiments of the present disclosure illustrate the set of output gratings 602 as fully overlapping physically in both the horizontal and vertical directions, it is noted herein the set of output gratings divide the total field of view 800 into two overlapping vertical zones. Therefore, the above description should not be interpreted as a limitation on the present disclosure but merely an illustration.

Figure 9A:
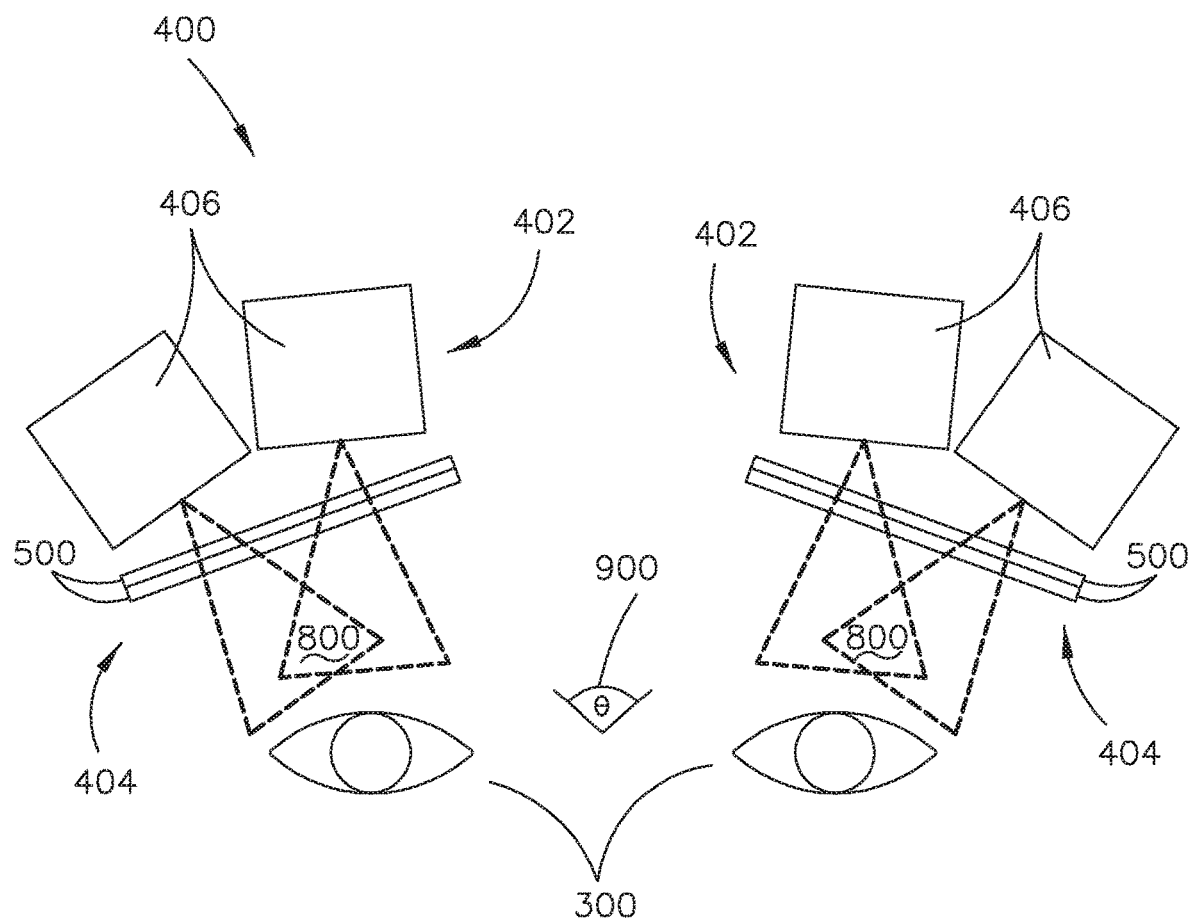
FIG. 9A schematically illustrates a display assembly of a wide field of view head worn display device, such as the wide field of view head worn display device illustrated in FIG. 4, in accordance with one or more embodiments of the disclosure.
Figure 9B:
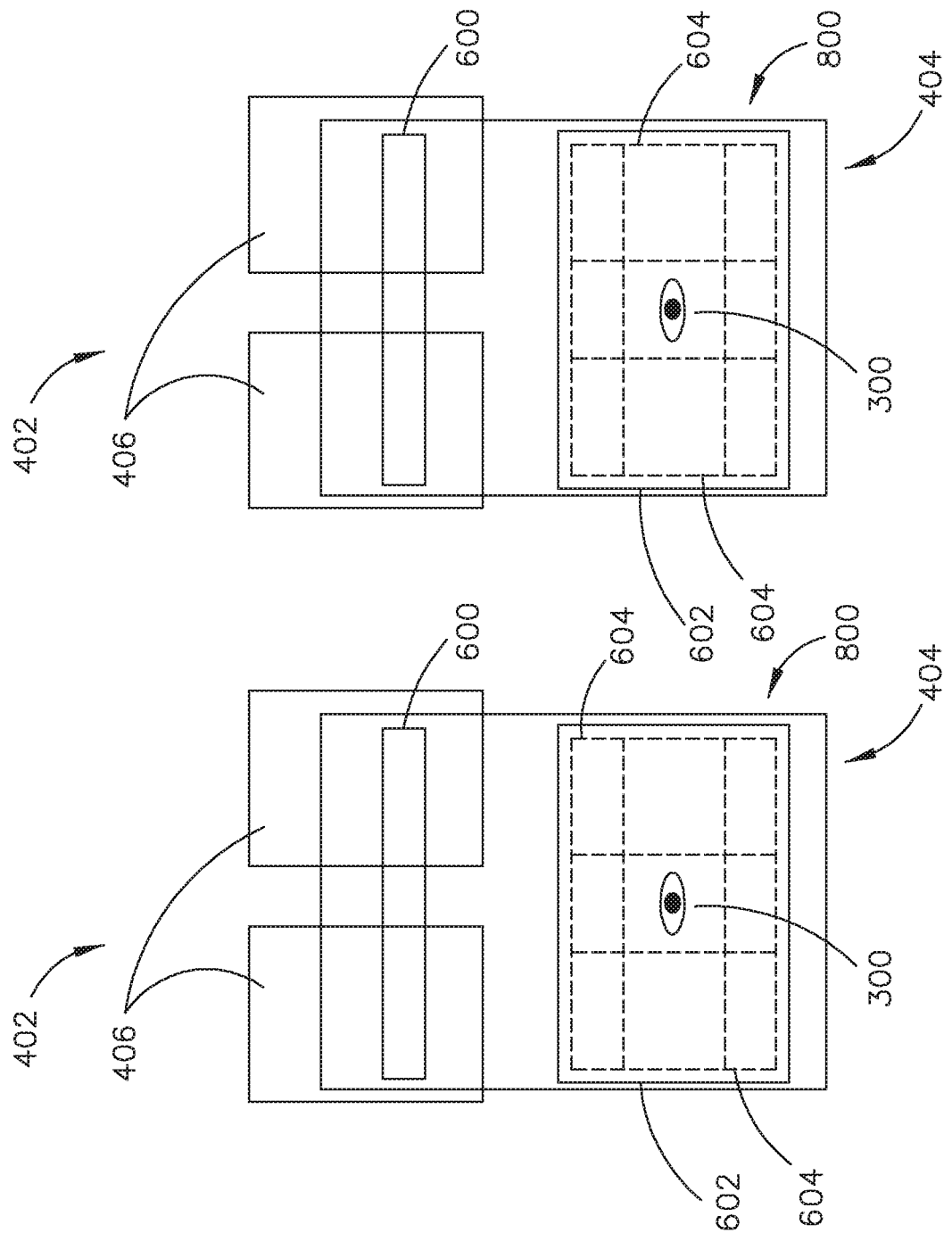
FIG. 9B schematically illustrates a display assembly of a wide field of view head worn display device, such as the wide field of view head worn display device illustrated in FIG. 4, in accordance with one or more embodiments of the disclosure.

Referring now to FIG. 9, the display device 400 may include a display assembly 402 and a second display assembly 402 (e.g., one for each eye of the operator 300). The display assembly 402 and the second display assembly 402 may include opposite offset. For example, the offset may be opposite and equal. By way of another example, the display assembly 402 may be rotated at an angle ranging from 5° to 35°. For instance, the display assembly 402 may be rotated 20°. By way of another example, the first display assembly may be rotated at an angle ranging from 5° to 35°. For instance, the second display assembly 402 may be rotated −20°. It is noted herein that the rotation of +/−20° of a 70° by 40° total field of view 800 of the display assembly 402 and a 70° by 40° second total field of view 800 of the second display assembly 402 may result in a 110° wide field of view 900. In this regard, the display device 400 may include a 110° by 40° wide field of view 900. It is noted herein, however, that in some embodiments the offset may be opposite and unequal. Therefore, the above description should not be interpreted as a limitation on the present disclosure but merely an illustration.

Although some embodiments of the present disclosure illustrate the display assembly 402 as including a monochrome color-configured waveguide stack 404 including the waveguide 500 and the second waveguide 500 to generate a monochrome color image, it is noted herein that in some embodiments the waveguide stack 404 may be an electronic multicolor-configured waveguide stack 404 including any number of waveguides. For example, the set of waveguides 500 may provide a first base color, while additional sets of waveguides may provide additional base colors to generate a multicolor image. For instance, the waveguide stack 404 may include a set of red waveguides, a set of green waveguides, and a set of blue waveguides in any order within the waveguide stack 404. It is noted herein, however, that the waveguide stack may include a set of waveguides of any base color, Therefore, the above description should not be interpreted as a limitation on the present disclosure but merely an illustration.

Figures 10A, 10B:
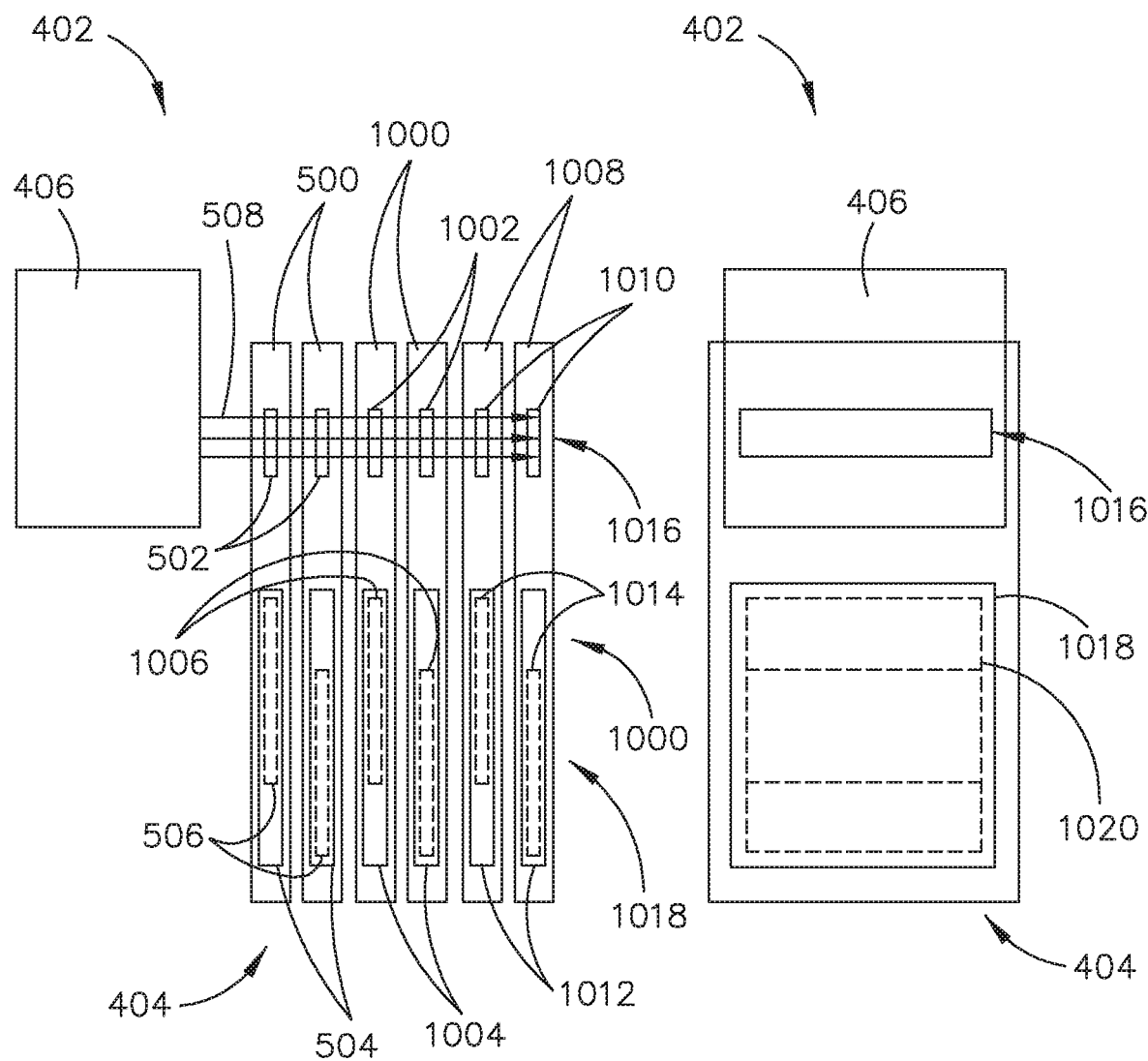
FIG. 10A schematically illustrates a display assembly of a wide field of view head worn display device, such as the wide field of view head worn display device illustrated in FIG. 4, in accordance with one or more embodiments of the disclosure.
FIG. 10B schematically illustrates a display assembly of a wide field of view head worn display device, such as the wide field of view head worn display device illustrated in FIG. 4, in accordance with one or more embodiments of the disclosure.

Referring now to FIGS. 10A and 10B, the waveguide stack 404 may include one or more sets of waveguides in addition to a set of waveguides with the waveguide 500 and the second waveguide 500.

The waveguide stack 404 may include a set of waveguides with a waveguide 1000 and a second waveguide 1000 in addition to the set of waveguides with the waveguide 500 and the second waveguide 500.

The waveguide 1000 may include an input grating 1002. The waveguide 1000 may include an output grating 1004 with a field of view 1006. For example, the field of view 1006 of the output grating 1004 may range from 40° by 30° to 110° by 50°. For instance, the output grating 1004 may include a 40° by 30° field of view 1006.

The second waveguide 1000 may include a second input grating 1002. The second waveguide 1000 may include a second output grating 1004 with a second field of view 1006. For example, the second field of view 1006 of the second output grating 1004 may range from 40° by 30° to 110° by 50°. For instance, the second output grating 1004 may include a 40° by 30° field of view 1006.

The waveguide 1000 and the second waveguide 1000 may be aligned such that the input grating 1002 and the second input grating 1002, respectively, at least partially overlap and form a set of input gratings. For example, the waveguide 1000 and the second waveguide 1000 may be aligned such that the input grating 1002 and the second input grating 1002 fully overlap.

The waveguide 1000 and the second waveguide 1000 may be aligned such that output grating 1004 with the field of view 1006 and the second output grating 1004 with the second field of view 1006 at least partially overlap vertically (e.g., to address a full vertical field of view) and form a set of output gratings with a combined field of view. For example, overlapping a 40° by 30° field for view 1006 and a 40° by 30° second field of view 1006 by 20° may result in a 40° by 40° combined field of view.

The waveguide stack 404 may include a set of waveguides with a waveguide 1008 and a second waveguide 1008 in addition to the set of waveguides with the waveguides 500 and the set of waveguides with the waveguides 1000.

The waveguide 1008 may include an input grating 1010 and an output grating 1012 with a field of view 1014. For example, the field of view 1014 of the output grating 1012 may range from 40° by 30° to 110° by 50°. For instance, the output grating 1012 may include a 40° by 30° field of view 1014.

The second waveguide 1008 may include a second input grating 1010 and a second output grating 1012 with a second field of view 1014. For example, the second field of view 1014 of the second output grating 1012 may range from 40° by 30° to 110° by 50°. For instance, the second output grating 1012 may include a 40° by 30° field of view 1014.

The waveguide 1008 and the second waveguide 1008 may be aligned such that the input grating 1010 and the second input grating 1010, respectively, at least partially overlap and form a set of input gratings. For example, the waveguide 1008 and the second waveguide 1008 may be aligned such that the input grating 1010 and the second input grating 1010 fully overlap.

The waveguide 1008 and the second waveguide 1008 may be aligned such that the output grating 1012 with the field of view 1014 and the second output grating 1012 with the second field of view 1014 at least partially overlap vertically (e.g., to address a full vertical field of view) and form a combined field of view. For example, overlapping a 40° by 30° field for view 1014 and a 40° by 30° second field of view 1014 by 20° may result in a 40° by 40° combined field of view.

The waveguides 500, 1000, 1008 within the waveguide stack 404 may be aligned such that the input grating 502, the second input grating 502, the input grating 1002, the second input grating 1002, the input grating 1010, and the second input grating 1010 at least partially overlap and form a set of input gratings 1016. For example, the waveguides 500, 1000, 1008 may be aligned such that the input grating 502, the second input grating 502, the input grating 1002, the second input grating 1002, the input grating 1010, and the second input grating 1010 fully overlap.

The waveguide stack 404 may be aligned such that the output grating 504 with the field of view 506, the second output grating 504 with the second field of view 506, the output grating 1004 with the field of view 1006, the second output grating 1004 with the second field of view 1006, the output grating 1012 with the field of view 1014, and the second output grating 1012 with the field of view 1014 at least partially overlap vertically (e.g., to address a full vertical field of view) and form a set of output gratings 1018 with a combined field of view 1020. For example, overlapping a 40° by 30° field for view 506, a 40° by 30° second field for view 506, a 40° by 30° field for view 1006, a 40° by 30° second field for view 1006, a 40° by 30° field for view 1014, and a 40° by 30° second field of view 1014 by 20° may result in a 40° by 40° combined field of view 1020.

It noted herein that the order of the waveguides within the waveguide stack 404 does not matter for the display assembly 402 to be multi-color. For example, the waveguides 500, the waveguides 1000, and the waveguides 1008 may be in any order within the stack for the display assembly 402 to be multi-color. In addition, it is noted herein that in some embodiments the display assembly 402 may include any optical components and/or electrical components necessary to provide luminance balancing of the multi-color waveguide stack 404.

Figure 11A:
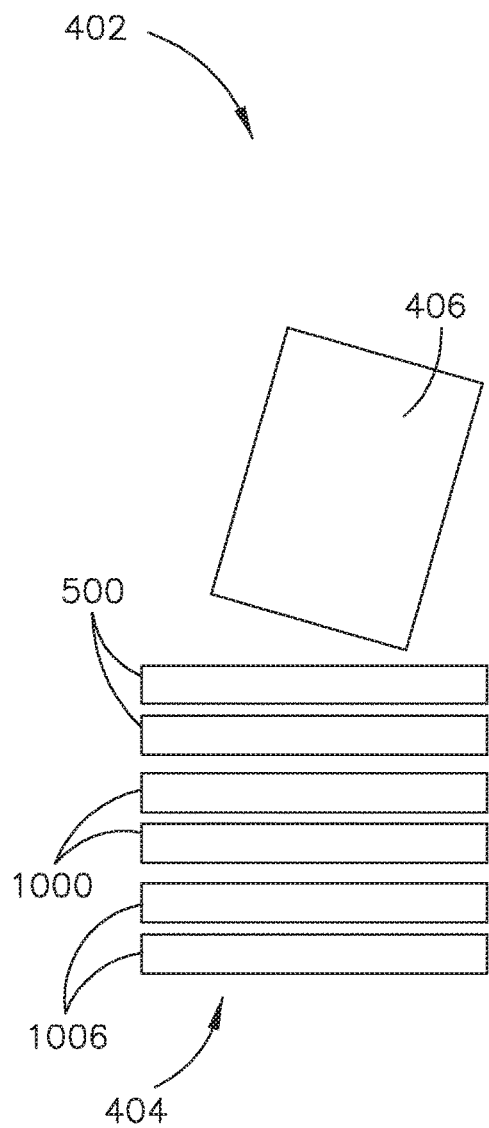
FIG. 11A schematically illustrates a display assembly of a wide field of view head worn display device, such as the wide field of view head worn display device illustrated in FIG. 4, in accordance with one or more embodiments of the disclosure.
Figure 11B:
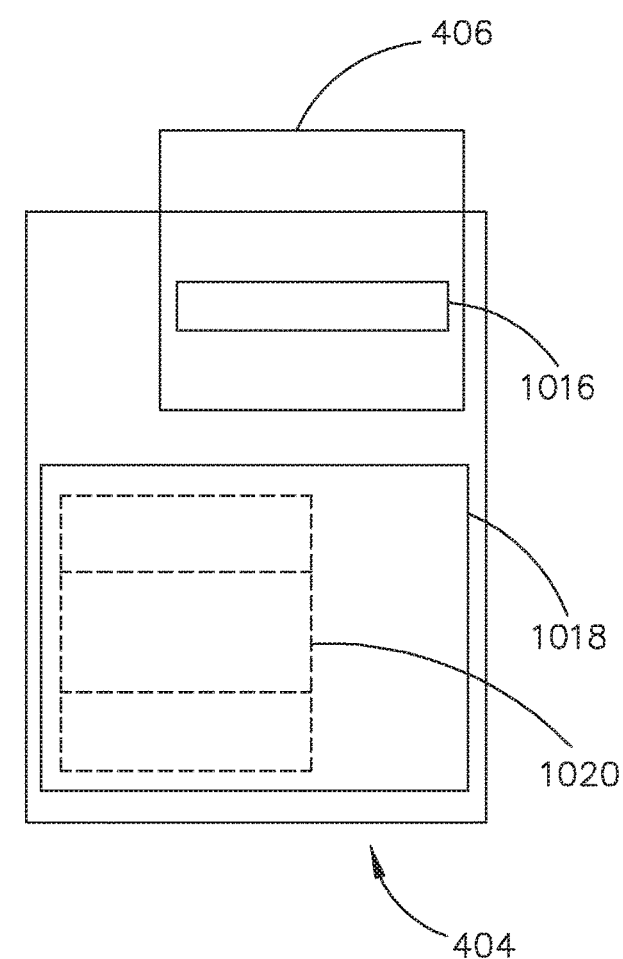
FIG. 11B schematically illustrates a display assembly of a wide field of view head worn display device, such as the wide field of view head worn display device illustrated in FIG. 4, in accordance with one or more embodiments of the disclosure.

Referring now to FIGS. 11A and 11B, the collimator 406 may be rotated. For example, the collimator 406 may be rotated to offset the combined field of view 1020 (e.g., offset laterally). For instance, the collimator 406 may be rotated about a vertical axis to expand the combined field of view 1020 horizontally. By way of another example, the collimator 406 may be rotated at an angle ranging from 5° to 30°. For instance, the collimator 406 may be rotated 15°.

Figure 12A:
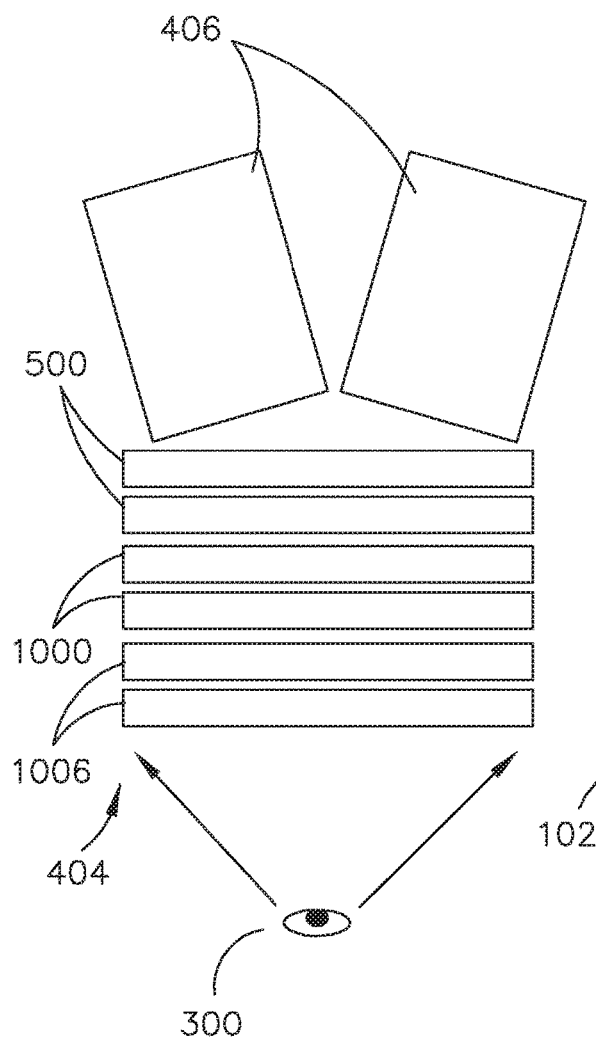
FIG. 12A schematically illustrates a display assembly of a wide field of view head worn display device, such as the wide field of view head worn display device illustrated in FIG. 4, in accordance with one or more embodiments of the disclosure.
Figure 12B:
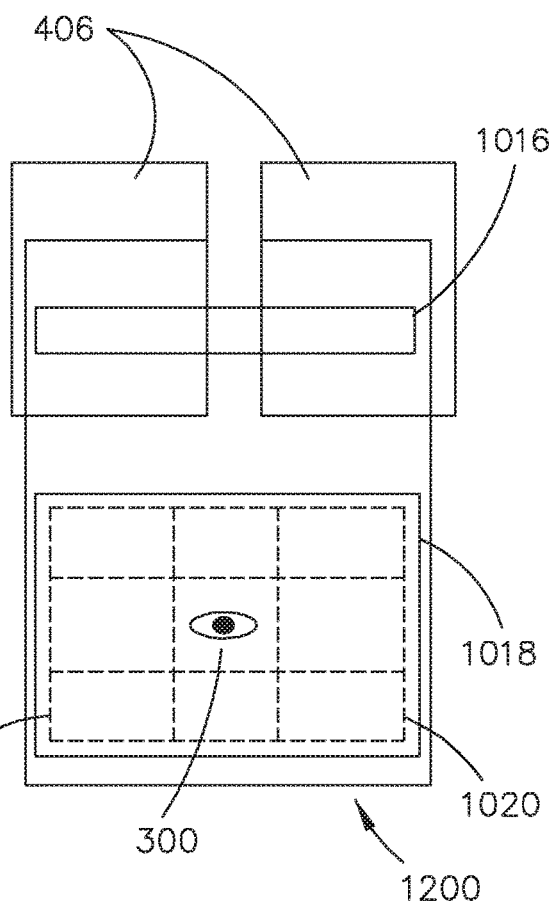
FIG. 12B schematically illustrates a display assembly of a wide field of view head worn display device, such as the wide field of view head worn display device illustrated in FIG. 4, in accordance with one or more embodiments of the disclosure.

Referring now to FIGS. 12A and 12B, a second collimator 406 may be added to the display assembly 402, as the waveguides within the waveguide stack 404 include wide acceptance cones in a horizontal direction (e.g., along a horizontal axis). The second collimator 406 may be rotated. For example, the second collimator 406 may be rotated to offset the combined field of view 1020 (e.g., offset laterally). For instance, the second collimator 406 may be rotated about a vertical axis to expand the combined field of view 1020 horizontally. By way of another example, the second collimator 406 may be rotated at an angle ranging from 5° to 30°. For instance, the second collimator 406 may be rotated 15°.

Where the display assembly 402 includes the collimator 406 and the second collimator 406, the combined field of view 1020 may be a seamless total field of view 1200. The collimator 406 and the second collimator 406 may include opposite offset. For example, the offset may be opposite and equal. For instance, the collimator 406 may be rotated 15° and the second collimator 406 may be rotated −15°. In this example, the rotation of +/−15° of a 40° by 40° collimator 406 and a 40° by 40° second collimator 406, respectively, may result in a 70° total field of view 1200 with a 10° overlap. In this regard, the display assembly 402 may include a 70° by 40° seamless total field of view 1200. It is noted herein, however, that in some embodiments the offset may be opposite and unequal. Therefore, the above description should not be interpreted as a limitation on the present disclosure but merely an illustration.

Although embodiments of the present disclosure illustrate the set of output gratings 1018 as fully overlapping physically in both the horizontal and vertical directions, it is noted herein the set of output gratings 1018 the total field of view 1200 into two overlapping vertical zones. Therefore, the above description should not be interpreted as a limitation on the present disclosure but merely an illustration.

Figure 13A:
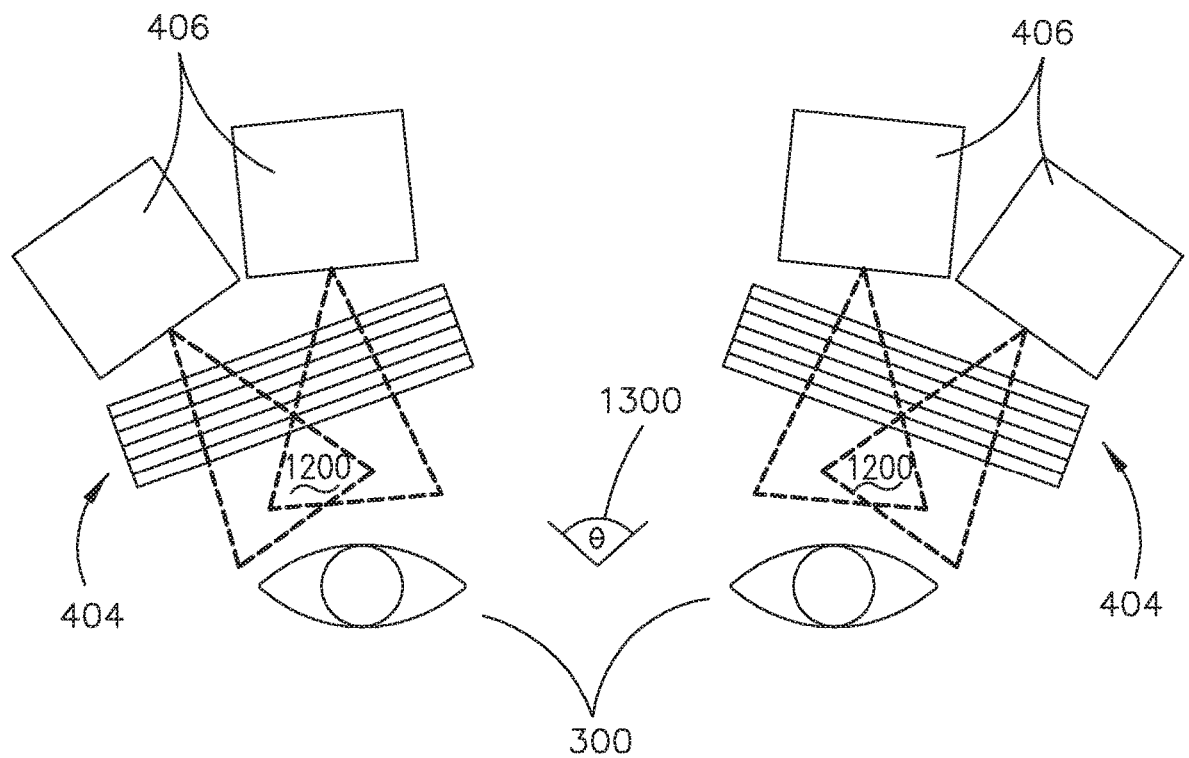
FIG. 13A schematically illustrates a display assembly of a wide field of view head worn display device, such as the wide field of view head worn display device illustrated in FIG. 4, in accordance with one or more embodiments of the disclosure.
Figure 13B:
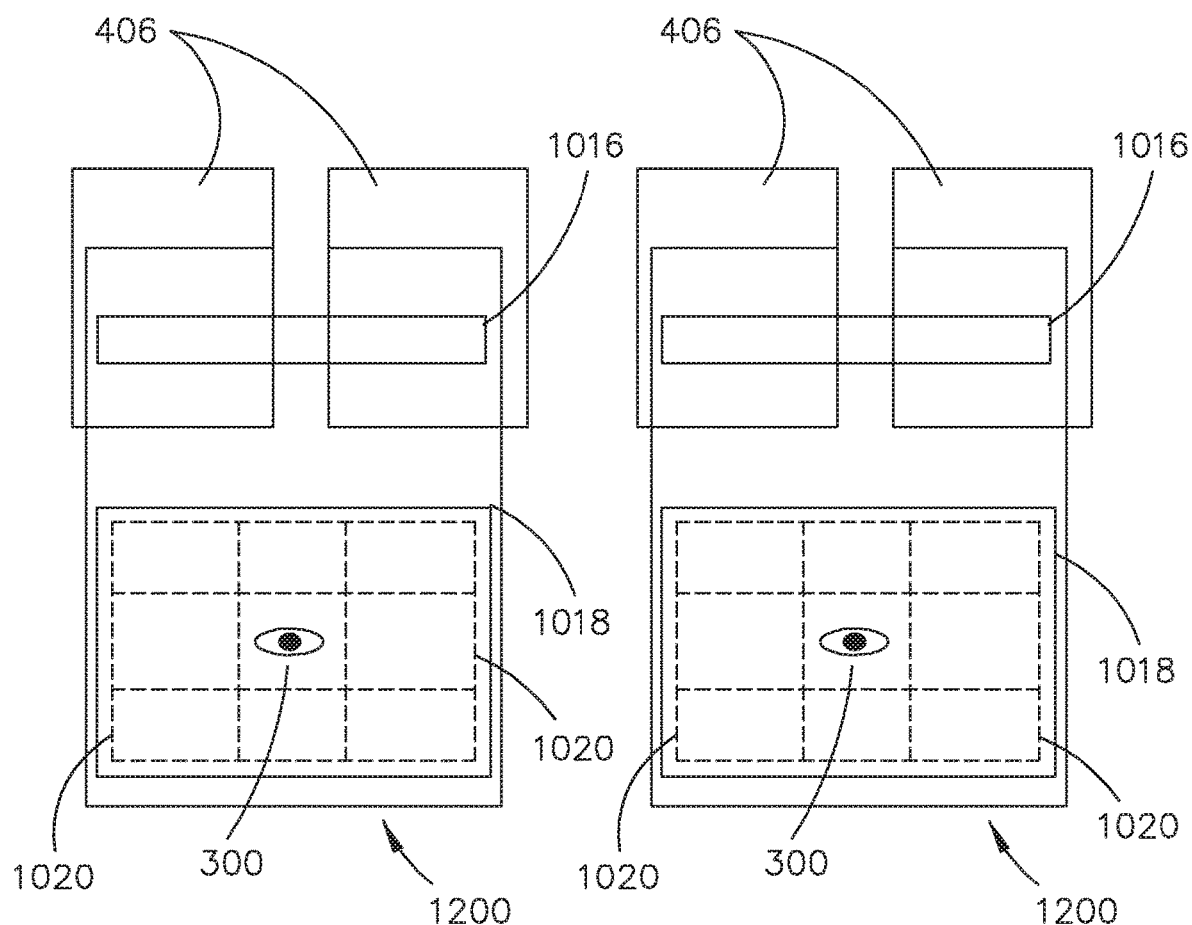
FIG. 13B schematically illustrates a display assembly of a wide field of view head worn display device, such as the wide field of view head worn display device illustrated in FIG. 4, in accordance with one or more embodiments of the disclosure.

Referring now to FIG. 13, the display device 400 may include a display assembly 402 and a second display assembly 402 (e.g., one for each eye of the operator 300). The display assembly 402 and the second display assembly 402 may include opposite offset. For example, the offset may be opposite and equal. For instance, the display assembly 402 may be rotated 20° and the second display assembly 402 may be rotated −20°. In this example, the rotation of +/−20° of a 70° by 40° total field of view 1200 of the display assembly 402 and a 70° by 40° second total field of view 1200 of the second display assembly 402 may result in a 110° wide field of view 1300. In this regard, the display device 400 may include a 110° by 40° wide field of view 1300. It is noted herein, however, that in some embodiments the offset may be opposite and unequal. Therefore, the above description should not be interpreted as a limitation on the present disclosure but merely an illustration.

Figure 14:
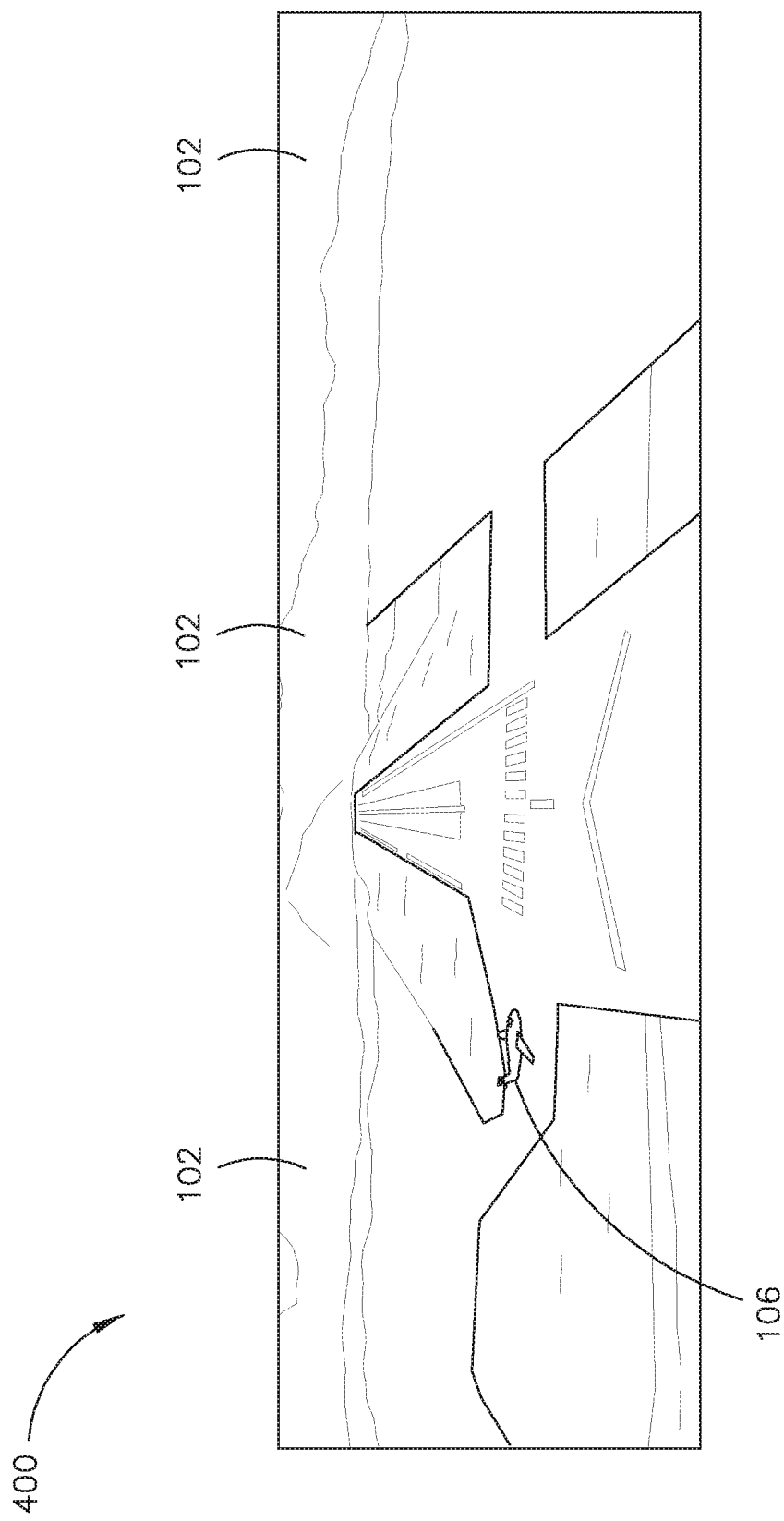
FIG. 14 is a seamless tiled display avionics environment, in accordance with one or more embodiments of the disclosure.

Referring now to FIG. 14, combining the two collimators 406 with the continuous waveguide stack 404 may merge the two pupils of the two collimators 406 to allow for seamless tiling of the tiled displays 102 while achieving the 70° by 40° total field of view 1200 of each display assembly 402 of the display device 400. In addition, combining two display assemblies 402, where each includes two rotated collimators 406 and a continuous waveguide stack 404, will allow for the seamless tiling of the tiled displays 102 while achieving the 110° by 40° wide field of view 1300 of the display device 400.

As illustrated above, the display device 400 does not require a dual-axis expansion of the waveguides within the waveguide stack 404 to obtain the wide field of views 900, 1300 (e.g., as might be required by the example display device 100). Instead, the display device 400 implements a single-axis expansion of the waveguides within the waveguide stack 404 by taking advantage of the wide acceptance cones in a horizontal direction (e.g., along a horizontal axis) of the waveguides within the waveguide stack 404 to focus multiple collimators 406 through the waveguide stack 404 for each display assembly 402.

Figure 15A:
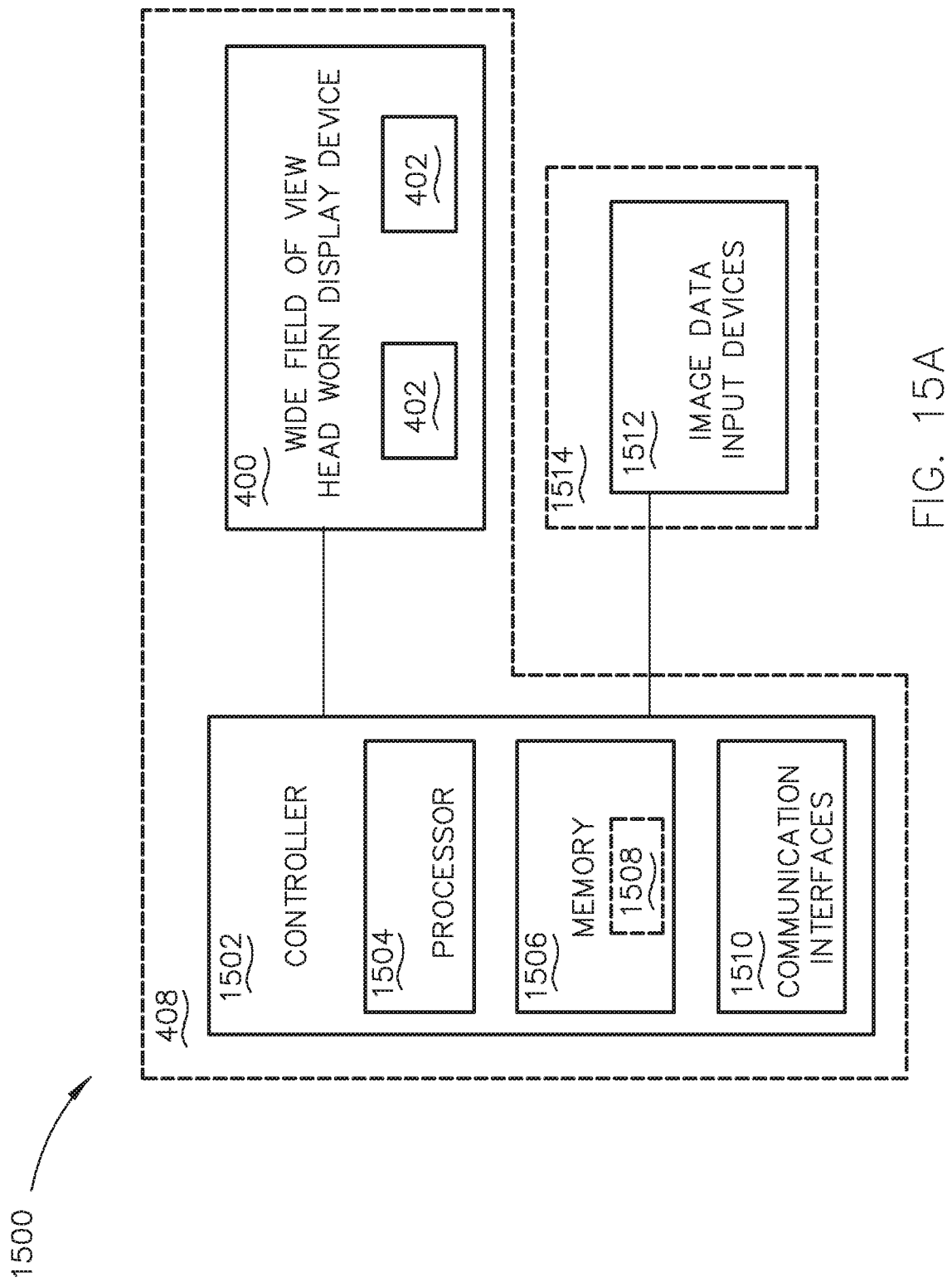
FIG. 15A is a block diagram illustrating a system that includes a wide field of view head worn display device, such as the wide field of view head worn display device illustrated in FIG. 4, in accordance with one or more embodiments of this disclosure.
Figure 15B:
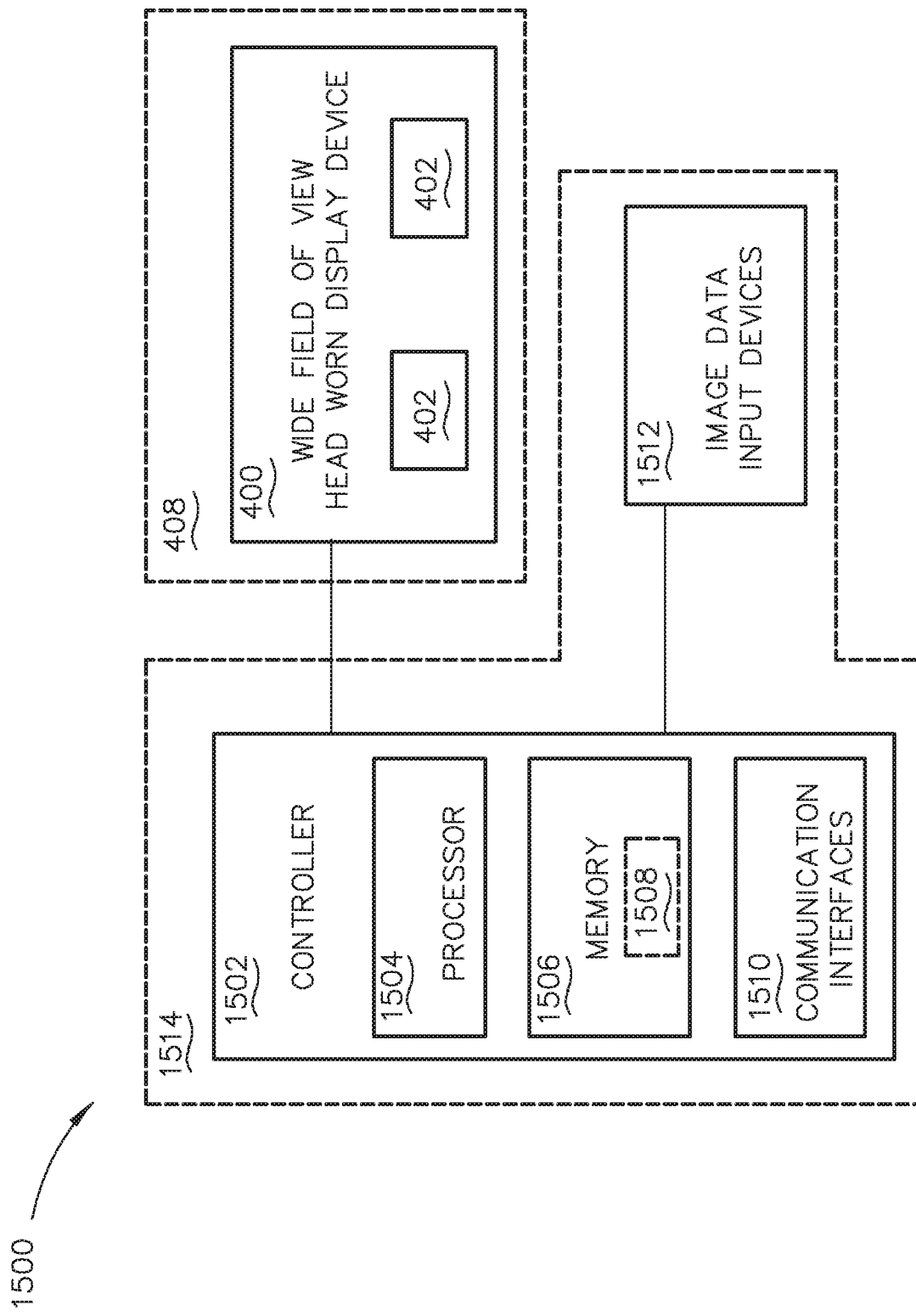
FIG. 15B is a block diagram illustrating a system that includes a wide field of view head worn display device, such as the wide field of view head worn display device illustrated in FIG. 4, in accordance with one or more embodiments of this disclosure.

FIGS. 15A and 15B generally illustrate a system 1500 including the wide field of view (FOV) head worn display device 400, in accordance with one or more embodiments of the disclosure.

The system 1500 may include a controller 1502. The controller 1502 may include at least one of one or more processors 1504, memory 1506 configured to store one or more sets of program instructions 1508, and/or one or more communication interfaces 1510. The one or more processors 1504 provides processing functionality for at least the controller 1502 and may include any number of processors, micro-controllers, circuitry, field programmable gate array (FPGA) or other processing systems, and resident or external memory for storing data, executable code, and other information accessed or generated by the controller 1502. The one or more processors 1504 may execute one or more software programs (e.g., the one or more sets of program instructions 1508) embodied in a non-transitory computer readable medium (e.g., the memory 1506) that implement techniques described herein. The one or more processors 1504 is not limited by the materials from which it is formed or the processing mechanisms employed therein and, as such, may be implemented via semiconductor(s) and/or transistors (e.g., using electronic integrated circuit (IC) components), and so forth.

The memory 1506 may be an example of tangible, computer-readable storage medium that provides storage functionality to store various data and/or program code associated with operation of the controller 1502 and/or one or more processors 1504, such as software programs and/or code segments, or other data to instruct the one or more processors 1504, and possibly other components of the controller 1502, to perform the functionality described herein. Thus, the memory 1506 may store data, such as a program of instructions for operating the controller 1502, including its components (e.g., one or more processors 1504, the one or more communication interface 1510, or the like), and so forth. It should be noted that while a single memory 1506 is described, a wide variety of types and combinations of memory (e.g., tangible, non-transitory memory) may be employed. The memory 1506 may be integral with the one or more processors 1504, may include stand-alone memory, or may be a combination of both. Some examples of the memory 1506 may include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The one or more communication interfaces 1510 may be operatively configured to communicate with components of the controller 1502. For example, the one or more communication interfaces 1510 may be configured to retrieve data from the one or more processors 1504 or other devices), transmit data for storage in the memory 1506, retrieve data from storage in the memory 1506, and so forth. The one or more communication interfaces 1510 may also be communicatively coupled with the one or more processors 1504 to facilitate data transfer between components of the controller 1502 and the one or more processors 1504. It should be noted that while the one or more communication interfaces 1510 is described as a component of the controller 1502, one or more components of the one or more communication interfaces 1510 may be implemented as external components communicatively coupled to the controller 1502 via a wired and/or wireless connection. The controller 1502 may also include and/or connect to one or more input/output (I/O) devices. In embodiments, the one or more communication interfaces 1510 includes or is coupled to a transmitter, receiver, transceiver, physical connection interface, or any combination thereof.

The one or more communication interfaces 510 may be operatively configured to communicate with one or more image data input devices 1512 (e.g., cameras, image sensors, or the like). The one or more communication interfaces 1510 may be operatively configured to communicate with components of the display device 400 (e.g., with components of the one or more display assemblies 402).

As illustrated in FIG. 15A, the display device 400 and the controller 1502 may be at least partially housed within the housing 408, while the one or more image data input devices 1512 may be installed onboard an aircraft 1514. As illustrated in FIG. 15B, the display device 400 may be at least partially housed within the housing 408, while the controller 1502 and the one or more image data input devices 1512 may be installed onboard the aircraft 1514.

The controller 1502 may be configured to perform one or more process steps, as defined by the one or more sets of program instructions 1508.

[own] In some steps, the one or more sets of program instructions 1508 may be configured to cause the controller 1502 to receive image data (e.g., via the one or more processors 1504) from the one or more image data input devices 1512.

In some steps, the one or more sets of program instructions 1508 may be configured to cause the controller 1502 to process the image data.

In some steps, the one or more sets of program instructions 1508 may be configured to cause the controller 1502 to generate one or more optical signals based on the processed image data.

In some steps, the one or more sets of program instructions 1508 may be configured to cause the controller 1502 to transmit at least a portion of the optical signals to one or more tiled displays (e.g., the one or more display assemblies 402) for display.

It is noted herein that in some embodiments the one or more process steps described above may be performed iteratively, concurrently, and/or sequentially. In addition, it is noted herein that in some embodiments the one or more sets of program instructions 1508 are not limited to the process steps provided. For example, the one or more sets of program instructions 1508 may instead include more or fewer processes. By way of another example, the one or more sets of program instructions 1508 may perform the process steps in an order other than provided. Therefore, the above description should not be interpreted as a limitation on the scope of the present disclosure, but merely an illustration.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:
1. A head worn display device, comprising:
a first display assembly and a second display assembly, each of the first display assembly and the second display assembly comprising:
a waveguide stack comprising at least one set of waveguides, each set of the at least one set of waveguides comprising a first waveguide with a field of view and a second waveguide with a field of view, the waveguide stack comprising a combined field of view generated by at least partially overlapping the field of view of the first waveguide and the field of view of the second waveguide;
a first collimator configured to direct illumination through the waveguide stack, the first collimator rotated a select collimator offset angle to offset the combined field of view of the waveguide stack in a first direction along a single axis; and
a second collimator configured to direct illumination through the waveguide stack, the second collimator rotated a select collimator offset angle to offset the combined field of view of the waveguide stack in a second direction along the single axis,
wherein offsetting the combined field of view merges a pupil of the first collimator and a pupil of the second collimator and generates a seamless total field of view for each of the first display assembly and the second display assembly, the first display assembly rotated a select display assembly offset angle to offset the total field of view of the first display assembly in the first direction along the single axis, the second display assembly rotated a select display assembly offset angle to offset the total field of view of the second display assembly in the second direction along the single axis, wherein rotating the first display assembly and the second display assembly generates a seamless wide field of view for the head worn display device.

2. The head worn display device of claim 1, the field of view of the first waveguide being 40 degrees by 30 degrees, the field of view of the second waveguide being 40 degrees by 30 degrees.

3. The head worn display device of claim 2, the combined field of view being 40 degrees by 40 degrees generated by overlapping the field of view of the first waveguide and the field of view of the second waveguide by 20 degrees.

4. The head worn display device of claim 3, the collimator offset angle of the first collimator and the collimator offset angle of the second collimator being equal and opposite in degrees.

5. The head worn display device of claim 4, the collimator offset angle of the first collimator being 15 degrees, the collimator offset angle of the second collimator being −15 degrees.

6. The head worn display device of claim 5, a field of view of the first collimator being 40 degrees by 40 degrees, a field of view of the second collimator being 40 degrees by 40 degrees.

7. The head worn display device of claim 6, the combined field of view being 70 degrees by 40 degrees generated by overlapping the field of view of the first collimator and the field of view of the second collimator by 10 degrees.

8. The head worn display device of claim 7, the display assembly offset angle of the first display assembly and the display assembly offset angle of the second display assembly being equal and opposite in degrees.

9. The head worn display device of claim 8, the display assembly offset angle of the first display assembly being 20 degrees, the display assembly offset angle of the second display assembly being −20 degrees.

10. The head worn display device of claim 9, the wide field of view being 110 degrees by 40 degrees.

11. The head worn display device of claim 1, the first waveguide and the second waveguide each comprising an input grating.

12. The head worn display device of claim 11, the input grating of the first waveguide and the input grating of the second waveguide being configured to overlap when the first waveguide and the second waveguide are aligned within the waveguide stack.

13. The head worn display device of claim 1, the first waveguide and the second waveguide each comprising an output grating.

14. The head worn display device of claim 13, the output grating of the first waveguide and the output grating of the second waveguide being configured to overlap when the first waveguide and the second waveguide are aligned within the waveguide stack.

15. The head worn display device of claim 1, the at least one set of waveguides comprising a single set of waveguides configured to generate a monochrome color image.

16. The head worn display device of claim 1, the at least one set of waveguides comprising three sets of waveguides configured to generate a multicolor image, each set of the three sets of waveguides being configured to produce a different base color for the multicolor image.

17. A display assembly for a head worn display device, comprising:
a waveguide stack comprising at least one set of waveguides, each set of the at least one set of waveguides comprising a first waveguide with a field of view and a second waveguide with a field of view, the waveguide stack comprising a combined field of view generated by at least partially overlapping the field of view of the first waveguide and the field of view of the second waveguide;

a first collimator configured to direct illumination through the waveguide stack, the first collimator rotated a select collimator offset angle to offset the combined field of view of the waveguide stack in a first direction along a single axis; and a second collimator configured to direct illumination through the waveguide stack, the second collimator rotated a select collimator offset angle to offset the combined field of view of the waveguide stack in a second direction along the single axis, wherein offsetting the combined field of view merges a pupil of the first collimator and a pupil of the second collimator and generates a seamless total field of view for the display assembly.

18. The display assembly of claim 17, the at least one set of waveguides comprising a single set of waveguides configured to generate a monochrome color image.

19. The display assembly of claim 17, the at least one set of waveguides comprising three sets of waveguides configured to generate a multicolor image, each set of the three sets of waveguides being configured to produce a different base color for the multicolor image.

20. A head worn display device, comprising:
a first display assembly and a second display assembly, each of the first display assembly and the second display assembly comprising:
a waveguide stack comprising at least three sets of waveguides configured to generate a multicolor image, each set of the three sets of waveguides being configured to produce a different base color for the multicolor image, each set of the three sets of waveguides comprising a first waveguide with a field of view and a second waveguide with a field of view, the waveguide stack comprising a combined field of view generated by at least partially overlapping the field of view of the first waveguide and the field of view of the second waveguide;

a first collimator configured to direct illumination through the waveguide stack, the first collimator rotated a select collimator offset angle to offset the combined field of view of the waveguide stack in a first direction along a single axis; and a second collimator configured to direct illumination through the waveguide stack, the second collimator rotated a select collimator offset angle to offset the combined field of view of the waveguide stack in a second direction along the single axis, wherein offsetting the combined field of view merges a pupil of the first collimator and a pupil of the second collimator and generates a seamless total field of view for each of the first display assembly and the second display assembly, the first display assembly rotated a select display assembly offset angle to offset the total field of view of the first display assembly in the first direction along the single axis, the second display assembly rotated a select display assembly offset angle to offset the total field of view of the second display assembly in the second direction along the single axis, wherein rotating the first display assembly and the second display assembly generates a seamless wide field of view for the head worn display device.

\* \* \* \* \*